(12) United States Patent
Shanmugam

(10) Patent No.: US 11,972,433 B2
(45) Date of Patent: *Apr. 30, 2024

(54) SYSTEM AND METHOD FOR PROVISIONING PAYMENT TOKEN TO PAYMENT ACCESSORY DEVICE

(71) Applicant: MasterCard International Incorporated, Purchase, NY (US)

(72) Inventor: Saravana Perumal Shanmugam, Fremont, CA (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 174 days.

This patent is subject to a terminal disclaimer.

(21) Appl. No.: 15/659,105

(22) Filed: Jul. 25, 2017

(65) Prior Publication Data

US 2017/0323297 A1 Nov. 9, 2017

Related U.S. Application Data

(63) Continuation-in-part of application No. 15/097,816, filed on Apr. 13, 2016, now Pat. No. 11,823,161.

(51) Int. Cl.
*G06Q 20/40* (2012.01)
*G06Q 20/22* (2012.01)
(Continued)

(52) U.S. Cl.
CPC ......... *G06Q 20/405* (2013.01); *G06Q 20/223* (2013.01); *G06Q 20/2295* (2020.05);
(Continued)

(58) Field of Classification Search
CPC ............... G06Q 20/405; G06Q 20/223; G06Q 20/3276; G06Q 20/3278; G06Q 20/35785;
(Continued)

(56) References Cited

U.S. PATENT DOCUMENTS 5,708,422 A * 1/1998 Blonder ............. G06Q 20/4037
379/114.15
10,147,441 B1 * 12/2018 Pogue .................... H04R 3/005
(Continued)

FOREIGN PATENT DOCUMENTS

WO 20130112839 A1 8/2013
WO 20170118923 A1 7/2017

OTHER PUBLICATIONS

Jason Fitzpatrick, How to Enable, Disable, and PIN Protect Voice Purchasing on Your Amazon Echo, Jun. 20, 2017, How-To Geek, pp. 1-6 (Year: 2017).*

(Continued)

*Primary Examiner* — Nilesh B Khatri
(74) *Attorney, Agent, or Firm* — Buckley, Maschoff & Talwalker LLC

(57) ABSTRACT

A payment accessory device is operatively coupled to a smart speaker. The smart speaker provides a voice-implemented personal assistant software service. A method of operating the payment accessory device includes communicating with a remote server computer via a mobile device. The purpose of the communication is for the mobile device to receive a payment token. The payment token is provisioned from the mobile device to the payment accessory device while positioning the mobile device in proximity to the payment accessory device. The provisioning of the payment token includes transfer of data from the mobile device to the payment accessory device.

18 Claims, 29 Drawing Sheets

(51) Int. Cl.
*G06Q 20/32* (2012.01)
*G06Q 20/38* (2012.01)
*H04W 4/80* (2018.01)

(52) U.S. Cl.
CPC ..... *G06Q 20/3276* (2013.01); *G06Q 20/3278* (2013.01); *G06Q 20/3829* (2013.01); *G06Q 20/385* (2013.01); *G06Q 20/40145* (2013.01); *H04W 4/80* (2018.02); *G06Q 2220/00* (2013.01)

(58) Field of Classification Search
CPC ............. G06Q 20/3829; G06Q 20/385; G06Q 20/40145; H04W 4/80
See application file for complete search history.

(56) References Cited

U.S. PATENT DOCUMENTS

| | | | | |
|---|---|---|---|---|
| 10,540,644 | B1* | 1/2020 | Walker | G07F 19/203 |
| 2001/0005839 | A1* | 6/2001 | Maenpaa | G06Q 30/06 |
| | | | | 705/65 |
| 2009/0157519 | A1* | 6/2009 | Bishop | G06Q 20/20 |
| | | | | 705/19 |
| 2013/0254052 | A1* | 9/2013 | Royyuru | G06Q 20/223 |
| | | | | 705/21 |
| 2014/0279479 | A1* | 9/2014 | Maniar | G06Q 20/36 |
| | | | | 705/41 |
| 2014/0289531 | A1* | 9/2014 | Yamakawa | H04L 9/3247 |
| | | | | 713/168 |
| 2015/0213443 | A1* | 7/2015 | Geffon | G06Q 20/3821 |
| | | | | 705/76 |
| 2015/0254664 | A1* | 9/2015 | Bondesen | G06Q 20/3821 |
| | | | | 705/44 |
| 2015/0348001 | A1* | 12/2015 | Van Os | G06Q 20/40 |
| | | | | 705/44 |
| 2015/0348008 | A1* | 12/2015 | Khan | G06Q 20/322 |
| | | | | 705/44 |
| 2016/0234026 | A1* | 8/2016 | Wilkins | G06F 21/64 |
| 2016/0247156 | A1* | 8/2016 | Hwang | G06Q 20/3278 |
| 2017/0017958 | A1* | 1/2017 | Scott | G06Q 20/40 |
| 2017/0091759 | A1* | 3/2017 | Selfridge | G06Q 20/385 |
| 2017/0109733 | A1* | 4/2017 | Heiman | G06Q 20/3821 |
| 2018/0075081 | A1* | 3/2018 | Chipman | G06F 16/955 |
| 2018/0121917 | A1* | 5/2018 | Purves | G06Q 20/3672 |
| 2018/0302408 | A1* | 10/2018 | Touati | H04L 9/3234 |

OTHER PUBLICATIONS

Eric Ravenscraft, How to Buy Things with Google Home, Jun. 20, 2017, How-To Geek, pp. 1-12 (Year: 2017).*

Huan Feng, et al., Continuous Authentication for Voice Assistants, Oct. 4, 2017, Association for Computing Machinery, pp. 343-355 (Year: 2017).*

"Frequently Asked Questions", MasterCard In Control, Retrieved on Oct. 26, 2015, download from https://www.mastercardincontrol.com/incgenhosted-web/us/public/faq, 2 pp.

"Payment Token Interoperability Standard: Guidelines for the Card Payment Ecosystem", Payment Token Standard, Version 1.0, Nov. 2013, 66 pp.

PCT International Search Report and Written Opinion for Application No. PCT/US2018/035333 dated Aug. 8, 2018, 10 pp.

* cited by examiner

SYSTEM AND METHOD FOR PROVISIONING PAYMENT TOKEN TO PAYMENT ACCESSORY DEVICE

CROSS-REFERENCE TO RELATED APPLICATION

This application is a continuation-in-part of U.S. patent application Ser. No. 15/097,816, filed Apr. 13, 2016, which application is incorporated herein by reference in its entirety for all purposes.

BACKGROUND

It is a common practice for employers to provide their employees with credit cards or other payment cards for the employees' use for making purchases on behalf of the employer and/or for paying for transactions that the employees may include on their expense account reports to the employer. However, even though use of a payment account may add convenience for transactions undertaken by employees in the course of their employment, there are also some inconvenient elements in current practices. For example, it can be a considerable administrative burden on the employer to order payment cards for new employees and to track receipt of the cards and deliver them to the employees. This may be especially true in the case of an employer that has employees located at numerous employment locations. There may also be a lag in time from the employer's request for the employee card until the card is received and distributed to the employee. Moreover, further administrative inconvenience may arise when cards are lost, etc., and need to be replaced. Still further, current practices in regard to setting and enforcing limits on use of employee cards may also involve undue administrative burdens on the employer.

In a somewhat similar situation, parents sometimes provide their adolescent or young adult children with payment cards that are linked to the parents' payment accounts. Again, however, ordering and receiving the child's payment card may entail inconvenience. Moreover, it may not be a straightforward matter for the parent to establish and enforce limits and accountability with respect to the child's use of the payment card provided to him/her.

The present inventor has also recognized that the concept of a "payment token" (i.e., a surrogate value that replaces a payment account number in part of a payment system) may be applicable to so-called "intelligent speakers" such as the well-known "Echo" device marketed by Amazon.com, Inc.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and exemplary embodiments and which are not necessarily drawn to scale, wherein.

DETAILED DESCRIPTION

Figure 1:
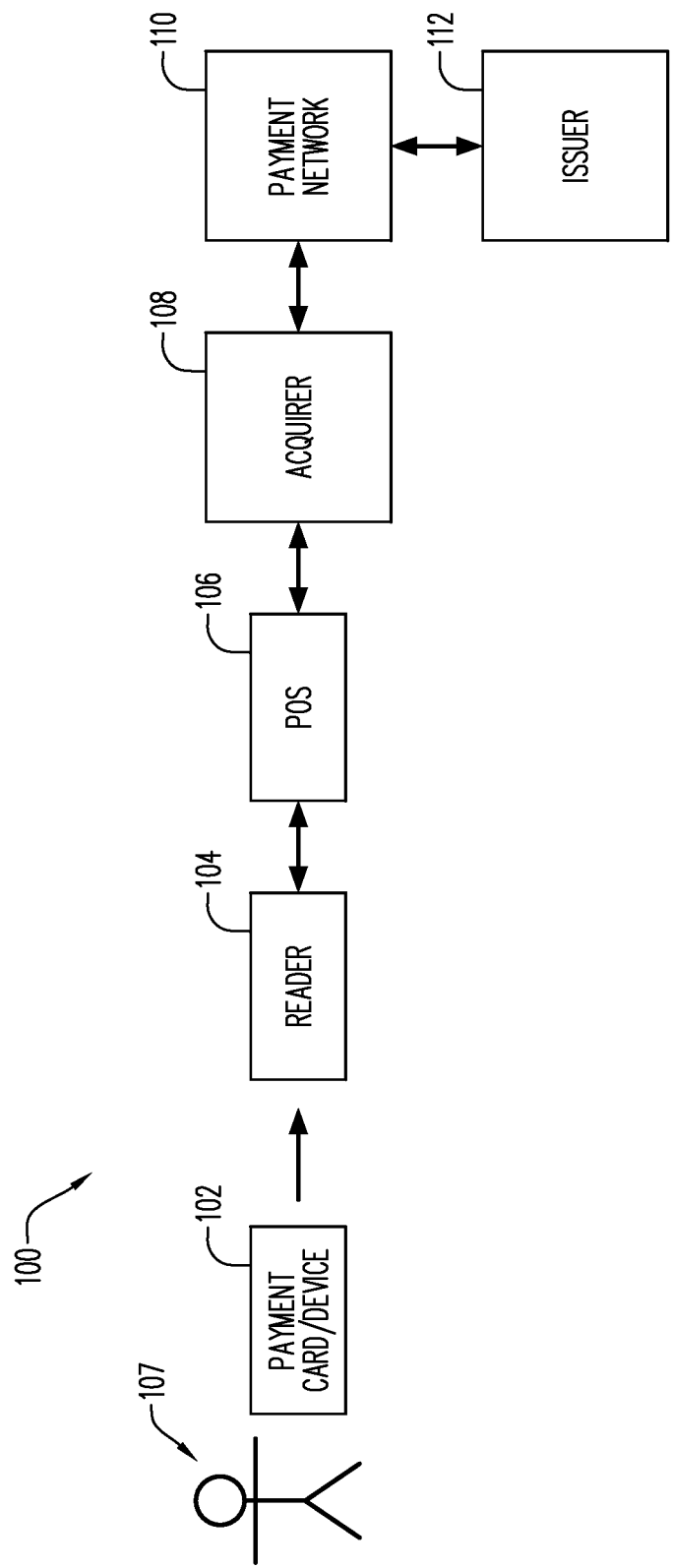
FIG. 1 is a block diagram that illustrates a conventional payment system.

In general, and to introduce concepts of embodiments of this disclosure, payment tokens are provisioned to mobile devices in lieu of providing employee or child physical payment cards. The mobile devices are carried by the employees or account holder's child, as the case may be. A corporate administrative person or the parent may control and initiate the provisioning of the payment token to the mobile device in question. The payment token that is provisioned may be associated with a corporate/departmental/parent's payment account and with the PAN (primary account number) that identifies the payment account in question. The provisioning service, in some embodiments, may be performed by a service provider that provides provisioning services to mobile devices as an entity that is trusted by the account issuers. Payment application programs (apps) may be downloaded as required to the mobile devices that are to receive the provisioning of the payment tokens. The corporate administrative person or parent may control the provisioning by operating a mobile device or other computing device to interact with the token provisioning service provider. In the case of the parent, at least, the mobile device used by the parent to initiate provisioning of the payment token to the child device may in itself be a payment-enabled mobile device that allows the parent to access the parent's payment account for use in payment transactions. The mobile devices used to initiate provisioning of payment tokens to other devices may also have received downloads of suitable application programs (also referred to as "apps") for that purpose.

The corporate administrative person or parent may engage in a rule set-up process to define one or more rules that may constrain use of the provisioned payment tokens with respect to payment transactions. The rules may be stored and/or enforced/applied at a central facility such as a payment network or a token service provider. The administrator or parent may also interact with a remote computer (e.g., a payment network or token service provider) to block use of a payment token after it has been provisioned to the employee/child mobile device. The administrator/parent may receive reports and/or alerts relating to payment transactions performed using the payment token(s) that have been provisioned to employee/child mobile devices. For reporting purposes, a central computer system (e.g., at a payment network or a token service provider) may keep records of the transactions using the payment tokens that have been provisioned to employee/child mobile devices.

In some embodiments, provisioning of the payment token to the child's (or employee's) device may be via short range communications (or scanning a QR code) from the parent's/administrator's mobile device.

By providing payment account access to employees or children via provisioning of payment tokens to their mobile devices, in lieu of providing plastic payment cards, significant efficiencies in administrative activities may be achieved, and payment account access may be provided more promptly than in commonly used practices. Rules constraining the employees' or children's use of the payment tokens may also be readily put in place and enforced.

In another environment for usage of a payment token, a payment accessory device may be provided for use with an intelligent speaker that provides voice-implemented intelligent personal assistant software services in a user's home. The intelligent personal assistant service may facilitate purchase or ordering of items via voice commands from the user. To facilitate payment for ordered/purchased items, a payment token may be provisioned to the payment accessory device via short range communications from the user's suitably programmed mobile device. This may prove to be a convenient alternative option as opposed to card-on-file arrangements with merchants who supply the ordered/purchased items.

FIG. 1 is a block diagram that illustrates a conventional payment system 100 that may be considered the operating environment and background in which aspects of the present disclosure may be deployed.

The system 100 includes a conventional payment card/device 102 (which may alternatively be, for example, a payment IC card or a payment-enabled mobile device that stores a payment card account number or payment token and runs a payment app). The system 100 further includes a reader component 104 associated with a POS terminal 106. In some known manner (depending on the type of the payment card/device 102) the reader component 104 is capable of reading the payment card account number/token and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction. Reference numeral 107 indicates a user/account holder who is a customer at the retail store and who has presented the payment card/device 102 to the reader component in order to settle the retail transaction.

A computer 108 operated by an acquirer (acquiring financial institution; sometimes referred to as a "transaction acquirer") is also shown as part of the system 100 in FIG. 1. The acquirer computer 108 may operate in a conventional manner to receive a payment account transaction authorization request message (sometimes referred to as an "authorization request") for the transaction from the POS terminal 106. The acquirer computer 108 may route the authorization request via a payment network 110 to the server computer 112 operated by the issuer of a payment account that is associated with the payment card/device 102. As is also well known, the payment account transaction authorization response message (also referred to as an "authorization response") generated by the payment account issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment accounts to individual users and other entities. For example, the payment account issuer server computer 112 may perform such functions as (a) receiving and responding to requests for authorization of payment account transactions to be charged to payment accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment cards or other devices for initiating payment transactions by presenting an associated payment account number or token to the reader component of a POS terminal.

As is also well known, payment account numbers and/or payment tokens may also be employed in online shopping transactions. In such transactions, the user/customer may interact with a shopping website hosted by the merchant's e-commerce server computer (not shown). For such transactions, the merchant's e-commerce server computer may perform many of the functions ascribed above to the POS terminal 106. Such functions may include initiating a payment transaction authorization request message and receiving back a payment transaction authorization response message.

Payment tokens have been defined as "surrogate values that replace [PANS]" in part of a payment system.

Figure 2:
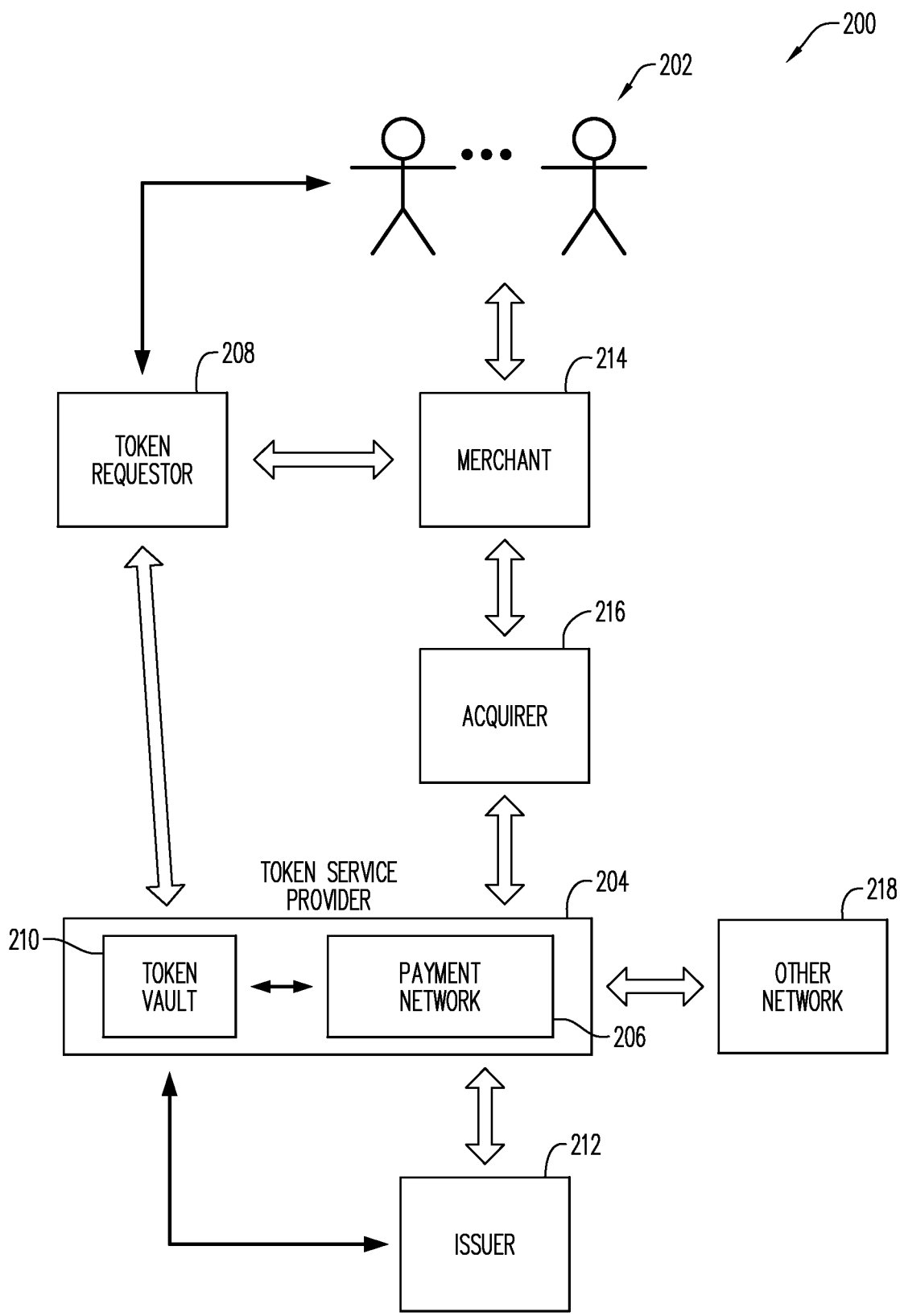
FIG. 2 is a block diagram that illustrates a payment system in which aspects of the present disclosure may be applied.

FIG. 2 is a block diagram that illustrates a system 200 in which teachings of the present disclosure may be applied. (FIG. 2 is adapted from the "FIG. 1" presented on page 10 of the Payment Token Interoperability Standard (issued by MasterCard International Incorporated (the assignee hereof), Visa and American Express in November 2013). Reference is also made to the EMV® Payment Tokenisation Specification, published March 2014, and available for downloading from www.emvco.com.

Individual users/cardholders are indicated by reference numeral 202 in FIG. 2. As is familiar to the reader, the vast majority of the users 202 may habitually carry with them mobile devices such as smartphones, tablet computers, or the like. (To simplify the drawing, these devices are not explicitly shown.) It is assumed that many of the mobile devices may be provisioned with respective payment tokens, in accordance with at least one use case described in the Payment Token Interoperability Standard.

FIG. 2 also includes a block 204 that represents a token service provider. The token service provider 204 may in some embodiments also be the operator of a payment network (block 206), such as the well-known Banknet° system operated by MasterCard International Incorporated, the assignee hereof. The token service provider 204 may be authorized in the system 200 to issue tokens. The payment tokens may be issued to token requestors such as the token requestor represented by block 208 in FIG. 2. (As set forth in the Payment Token Interoperability Standard, token requestors may, for example, include payment card account issuers; card-on-file merchants; acquirers, acquirer-processors, etc.; OEM device manufacturers; and digital wallet providers). Each token requestor 208 may be required to register with the token service provider 204.

In issuing tokens, the token service provider 204 may perform such functions as operating and maintaining a token vault 210, generating and issuing payment tokens assuring security and proper controls, token provisioning (e.g., provisioning NFC-capable mobile devices with token values; personalizing payment cards with token values), and registering token requestors.

In addition to representing the token service provider, block 204 should also be understood to represent one or more computer systems operated by the token service provider.

Block 212 in FIG. 2 represents an issuer of payment card accounts held by the cardholders 202. Those who are skilled in the art will understand that the issuer is typically a bank or other financial institution, and may provide banking services to the cardholders 202 in addition to issuing payment card accounts (e.g., credit card accounts, debit card accounts) to the cardholders 202. It was noted above that issuers 212 may also have the role of token requestor (block 208) in the system 200.

Block 214 in FIG. 2 represents a merchant to which the cardholders 202 may present payment devices (payment cards and/or payment-enabled mobile devices—e.g., NFC-enabled and token-provisioned mobile devices, etc., none of which are shown in the drawing) to consummate a purchase transaction. In some cases the merchant 214 may also be a token requestor 208 (e.g., for implementing a tokenized card-on-file arrangement for e-commerce transactions with a cardholder 202). According to previously proposed use cases, the merchant may receive a token value from a cardholder's payment device and issue an authorization request to initiate processing of a payment transaction in the system 200.

Block 216 in FIG. 2 represents an acquirer. As is well known, the acquirer may be a financial institution that provides banking services to the merchant 214, and that receives and routes payment transaction authorization requests originated from the merchant 214.

Also shown in FIG. 2 is a block 218, representing another payment network with which the token service provider 204 may interact.

It will be readily appreciated that a practical embodiment of the system 200 may include numerous merchants, token requestors, acquirers and issuers, rather than one of each as depicted in FIG. 2. It may also be the case that there is more than one token service provider in the system.

Figure 3:
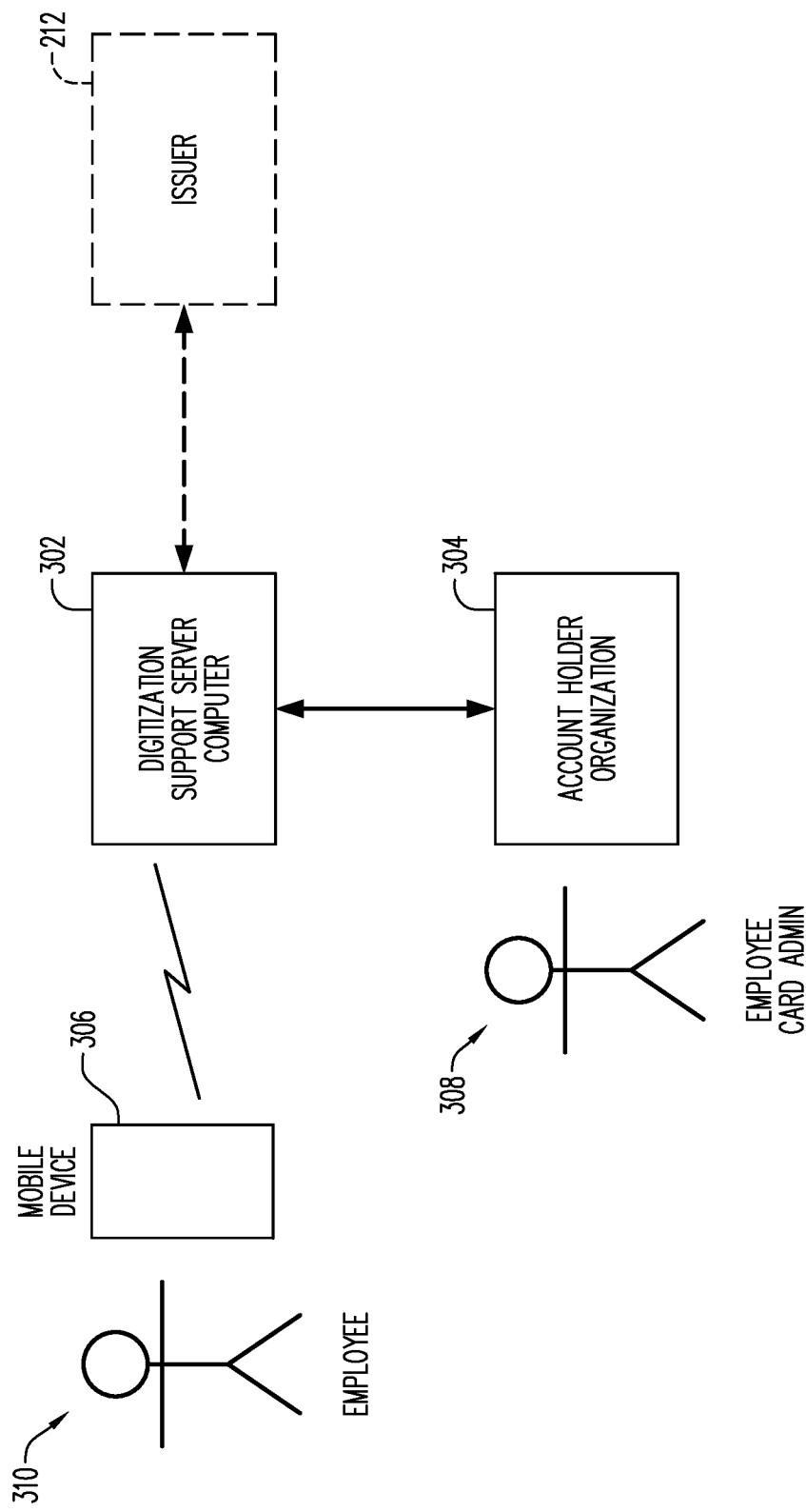
FIGS. 3-9 are block diagrams that illustrate various aspects of payment systems provided according to teachings of the present disclosure.

FIG. 3 is a block diagram that illustrates certain aspects of a payment system that may be provided according to teachings of the present disclosure and that may incorporate some or all of the elements of the payment systems illustrated in FIGS. 1 and 2.

Among the payment system components shown in FIG. 3 is a digitization support server computer 302. The digitization support server computer 302 may provide support to payment account issuers in connection with the electronic logistics involved in provisioning PANs and/or payment tokens to mobile devices. For example, the digitization support server computer 302 may implement functionality as is currently made available via the MasterCard Digital Enablement Service (MDES), a service of MasterCard International Incorporated, the assignee hereof. In addition, the digitization support server computer 302 may provide additional functionality as described herein. As will be seen, the digitization support server computer 302 may also be in the role of a token requestor (as represented by block 208 in FIG. 2).

Another component of the payment system is a typical account holder organization 304, which may be a corporation, a not-for-profit organization, or the like. The account holder organization 304 may be the holder of one or more payment accounts issued by an account issuer 212. Block 304 should also be understood to represent one or more computing devices (e.g., smartphones, tablet computers, laptop or notebook computers, personal computers) owned by and operated on behalf of the account holder organization 304. It will be understood that each payment account held by the account holder organization 304 may be identified by a respective PAN. (In practical embodiments of the systems disclosed herein, there may be numerous account holder organizations that are participants in the systems.)

Also shown in FIG. 3 is a mobile device 306, which is the target for the provisioning of a payment token, as described further below. When suitably programmed with a payment app and provisioned with a payment token, the mobile device 306 is operable to function as a payment-enabled device like the element 102 shown in FIG. 1.

Reference numeral 308 indicates an individual who serves as an administrator for the account holder organization 304 in the processes involved in making corporate "card" accounts available to employees of the organization 304 by provisioning payment tokens to the employees' mobile devices. One such employee in the latter category is indicated by reference numeral 310 and is shown as the user of the mobile device 306. The mobile device 306 may be owned by the account holder organization 304 and supplied for the employee's use while remaining the property of the account holder organization 304; or, alternatively, the mobile device may be owned by the employee 310 and used with the consent of the account holder organization 304 in connection with business of the account holder organization according to a "BYOD" (bring your own device) program of the account holder organization. In either case, the mobile device 306 may in effect be registered to the employee 310 in mobile device management records of the account holder organization 304.

In brief, and as described in more detail below, the administrator 308 may issue a corporate "card" to the employee 310 by interacting with the digitization support server computer 302 via a computing device (e.g., as represented by block 304) to request that the digitization support server computer 302 provision a payment token to the mobile device 306 used by the employee 310. In some embodiments, and/or in some situations, the digitization support server computer 302 may obtain consent from the account issuer 212 or otherwise interact with the issuer 212 in connection with provisioning the payment token to the mobile device 306. The payment token may be associated with the PAN that identifies a payment account issued by the account issuer 212 to the account holder organization 304. In connection with requesting provisioning of the payment token to the mobile device 306, the administrator 308 may prescribe and/or set-up one or more rules to govern/constrain the use of the payment token in payment transactions. Further details concerning rule setting will be provided below. The digitization support server computer 302 may provide reports to the account holder organization 304 concerning transactions performed by the payment-enabled mobile device 306 using the payment token. Those transactions may be charged to the PAN for the account holder organization's corresponding payment account at the level of the account issuer 212.

Figure 4:
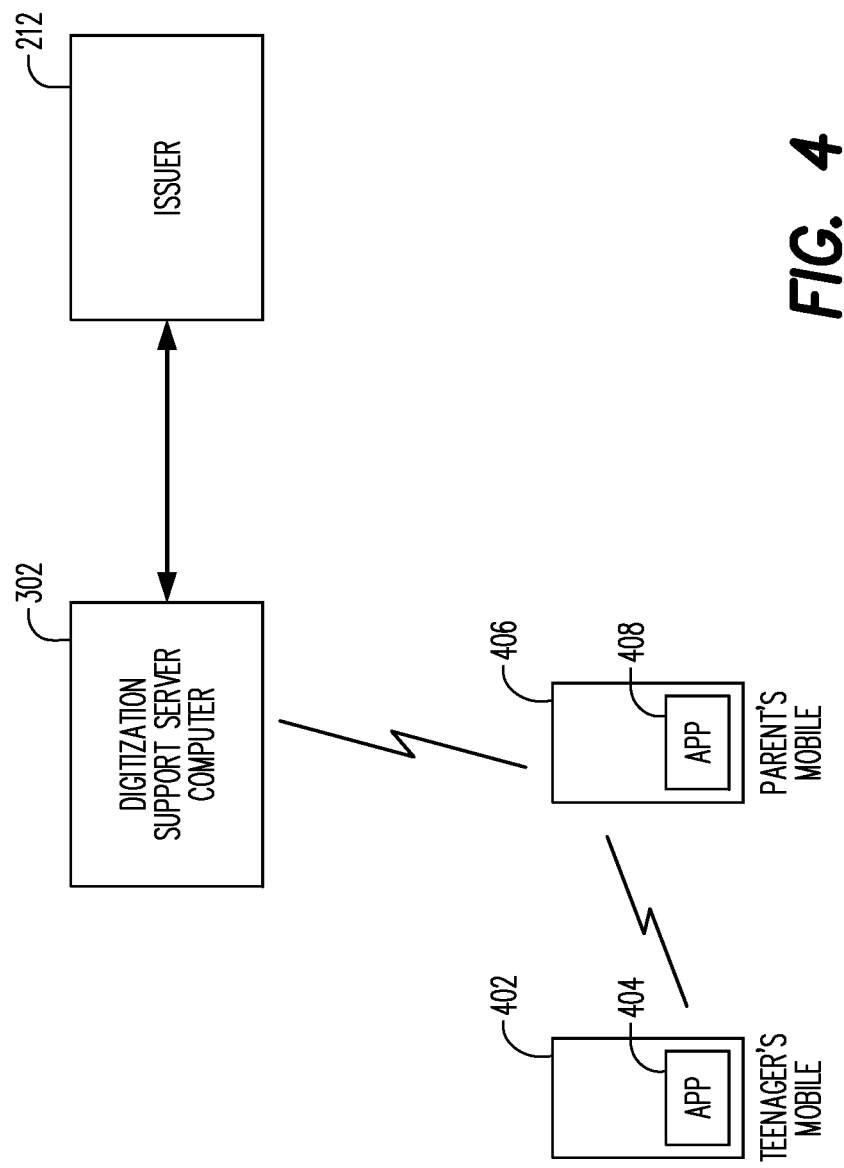

FIG. 4 is a block diagram that illustrates certain aspects of a payment system that may be provided according to teachings of the present disclosure and that may incorporate some or all of the elements of the payment systems illustrated in FIGS. 1 and 2. Unlike FIG. 3, which is primarily concerned with streamlining provision of corporate "cards" to employees, FIG. 4 is illustrative of functionality to aid an account holder/parent to provide payment account access to a child or other family member.

Referring then to FIG. 4, it will be noted that the digitization support server computer 302 is again shown, as is the account issuer 212. Reference numeral 402 indicates the "target" mobile device, i.e., the mobile device used by the child/family member (not shown) of the account holder (not shown). A payment app that has been downloaded to the mobile device 402 is indicated at 404. The mobile device owned/operated by the parent/primary account holder is indicated by reference numeral 406. An app that supports the account holder's token provisioning request is indicated at 408. It will be appreciated that the latter app may have been downloaded to the mobile device 406 to allow the account holder to proceed with one or more token provisioning requests. It should be understood that the account issuer 212 has issued to the account holder a payment account to which the child/family member is now to be given access. (In practical embodiments of the systems disclosed herein, the systems may include, as participants, numerous account holders of the type referred to above in connection with mobile device 406.)

Continuing to refer to FIG. 4, the account holder may use the mobile device 406 to interact "over the air" with the digitization support server computer 302 to request a payment token to be provisioned to the child mobile device 402 via the account holder mobile device 406. It may typically be the case that the digitization support server computer 302 obtains consent from the account issuer 212 before fulfilling the provisioning request from the account holder. Moreover, it may often be the case that the account issuer 212 will engage in an ID&V (identification and verification) process with respect to the account holder who is making the provisioning request. Alternatively, the digitization support server computer 302 may perform the ID&V or some other form of user authentication without involving the account issuer 212. For example, where the account holder's mobile device is payment-enabled, and with biometric user authentication typically performed for each transaction, in such a case it may be sufficient for the account holder to be authenticated by the customary biometric user authentication method.

Further details of example processes for provisioning a payment token to a child's mobile device will be provided below.

Figure 5:
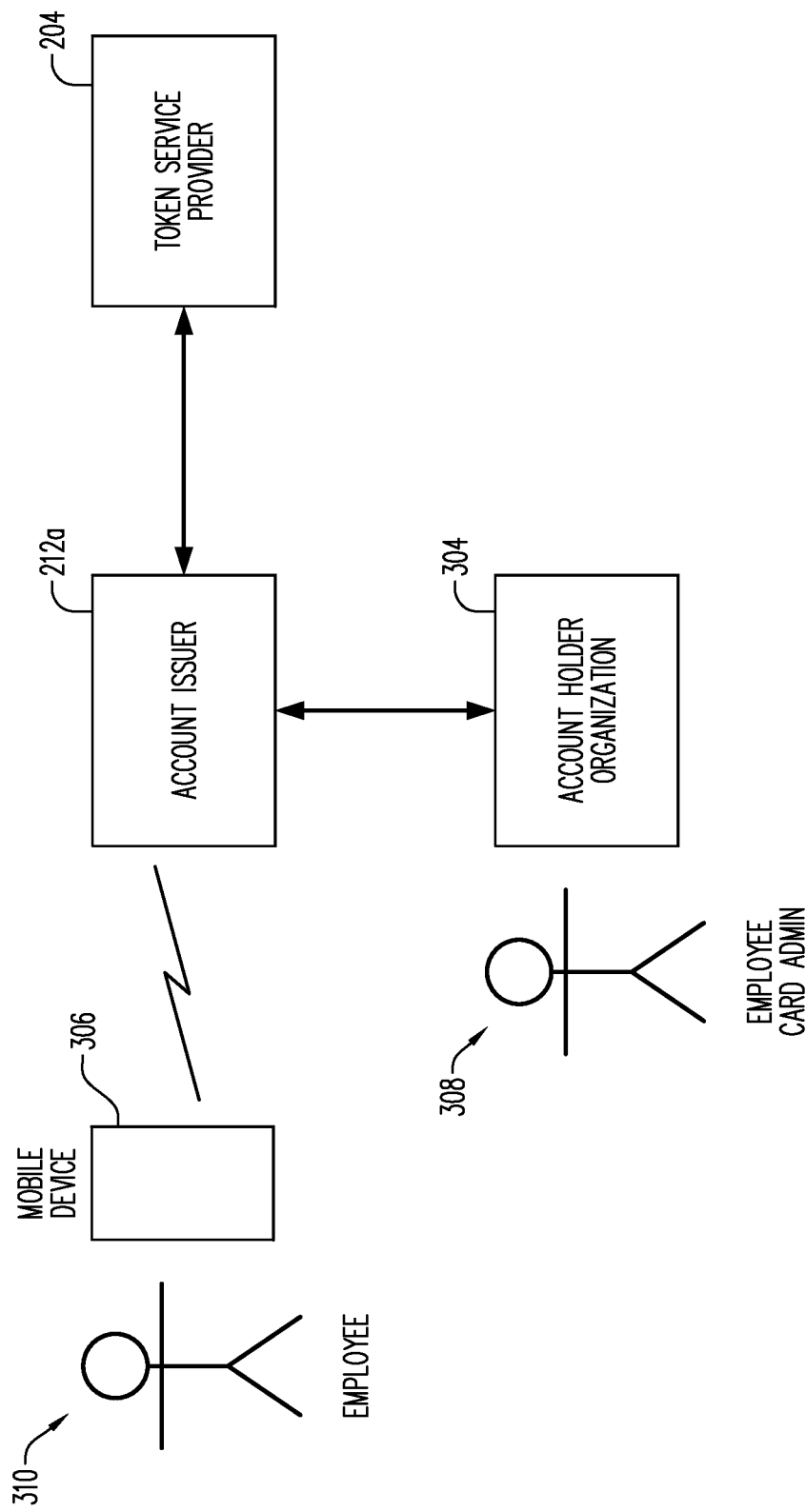

FIG. 5 is a block diagram that illustrates certain aspects of a payment system that may be provided according to teachings of the present disclosure and that may incorporate some or all of the elements of the payment systems illustrated in FIGS. 1 and 2. FIG. 5 may be compared with FIG. 3. Again in FIG. 5, the desired functionality is to fulfill provisioning of a payment token to the mobile device 306 used by an employee 310 of an account holder organization (block 304, which also represents one or more computing devices operated on behalf of the account holder organization). In contrast to FIG. 3, FIG. 5 does not show a digitization support server computer. Instead, it is assumed that the account issuer 212a handles directly the electronic logistics involved in provisioning payment tokens to mobile devices. Per the above discussion of FIG. 2, the account issuer 212a may function as a token requester, and may request and receive payment tokens from the token service provider 204 (shown in FIG. 5 as well as in FIG. 2).

As with FIG. 3, an administrative employee (reference numeral 308) of the account holder organization is shown in FIG. 5. The administrator 308 may initiate the employee's access to a "corporate card" by interacting with the account issuer 212a to request that the account issuer provision a payment token (obtained by the account issuer from the token service provider 204) to the mobile device 306 used by the employee 308.

In many if not all respects, the above description of FIG. 3 is generally applicable to the functionality achieved according to the arrangement shown in FIG. 5.

Figure 6:
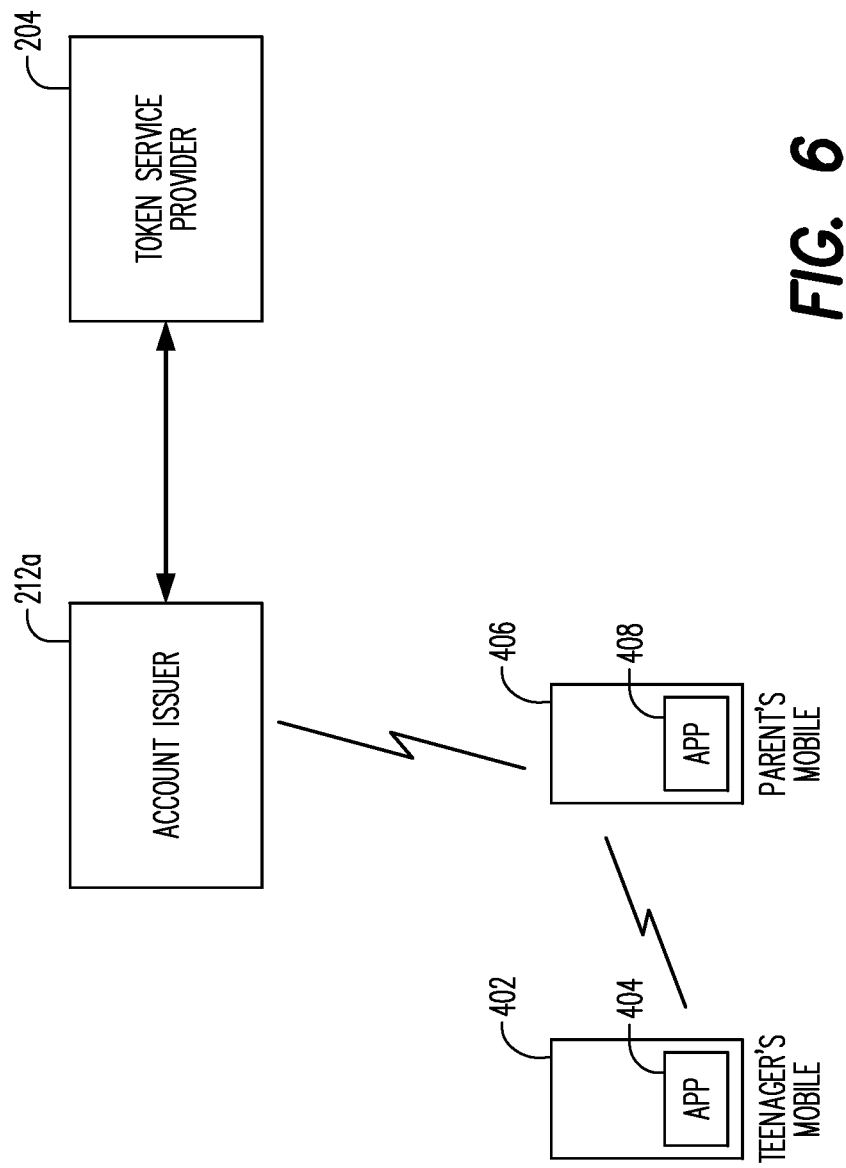

FIG. 6 is a block diagram that illustrates certain aspects of a payment system that may be provided according to teachings of the present disclosure and that may incorporate some or all of the elements of the payment systems illustrated in FIGS. 1 and 2. FIG. 6 may be compared with FIG. 4; the differences between FIG. 6 and FIG. 4 are analogous to the differences between FIG. 5 and FIG. 3. That is, FIG. 6, unlike FIG. 4, does not show a digitization support server computer. Rather, for the arrangement of FIG. 6, it is assumed that the account issuer 212a handles the electronic logistics of provisioning account numbers/payment tokens to mobile devices without enlisting the services of a service provider such as MDES.

Again, the desired functionality in the arrangement of FIG. 6 is to provision a payment token to the mobile device 402 used by the account holder's child/family member (not shown) so as to permit the child/family member to have (possibly controlled) access to the account holder's payment account. The provisioning of the payment token to the child's mobile device 402 may be initiated by the account holder by interacting with the account issuer 212a via the account holder's mobile device 406. Presumably ID&V and/or some sort of user authentication may be required to be successfully completed before fulfillment of the requested provisioning. As in the arrangement of FIG. 5, the account issuer 212a may request and receive the payment token from the token service provider 204 for provisioning to the child's mobile device 402. As in the arrangement of FIG. 4, the provisioning of the payment token to the child mobile device 402 may be via the account holder's mobile device 406.

In many if not all respects, the above description of FIG. 4 is generally applicable to the functionality achieved according to the arrangement shown in FIG. 6.

Figure 7:
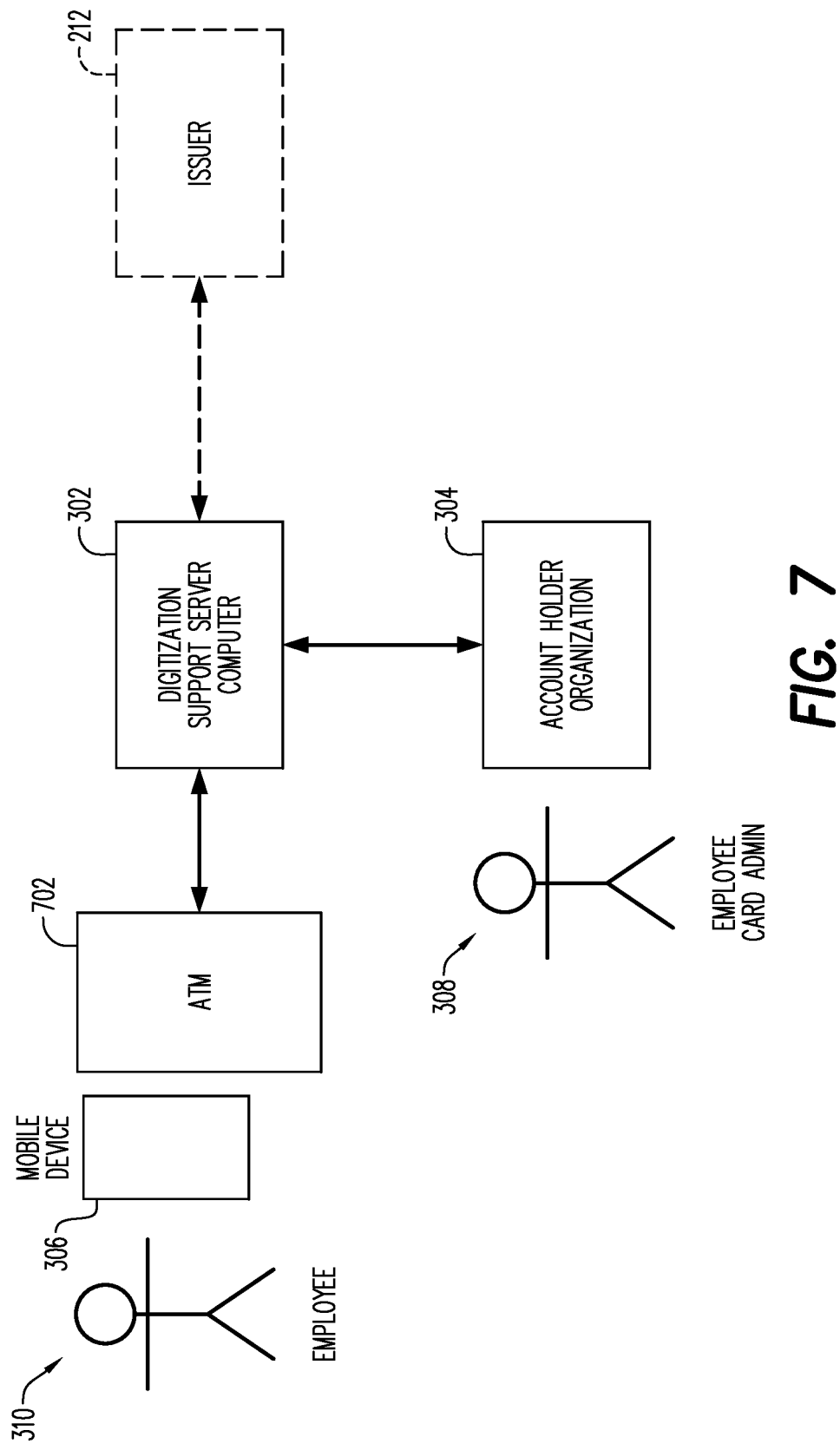

FIG. 7 is a block diagram that illustrates certain aspects of a payment system that may be provided according to teachings of the present disclosure and that may incorporate some or all of the elements of the payment systems illustrated in FIGS. 1 and 2. FIG. 7 may be viewed as another variation on the arrangement of FIG. 3. In essence the arrangement of FIG. 7 differs from the arrangement of FIG. 3 only in that the arrangement of FIG. 3 assumes provisioning of the payment token from the digitization support server computer 302 to the employee mobile device 306 occurs "over the air", whereas in the arrangement of FIG. 7—for enhanced security—the mobile device 306 is brought to an ATM (automated teller machine) 702 to receive provisioning of the payment token. It may be assumed that the ATM has NFC (near field communication) capability or the like, as does the mobile device 306. The payment token may be communicated via secure data channel from the digitization support server computer 302 to the ATM 702, and then the provisioning may be completed through a local wireless data communication link between the ATM 702 and the mobile device 306.

Figure 8:
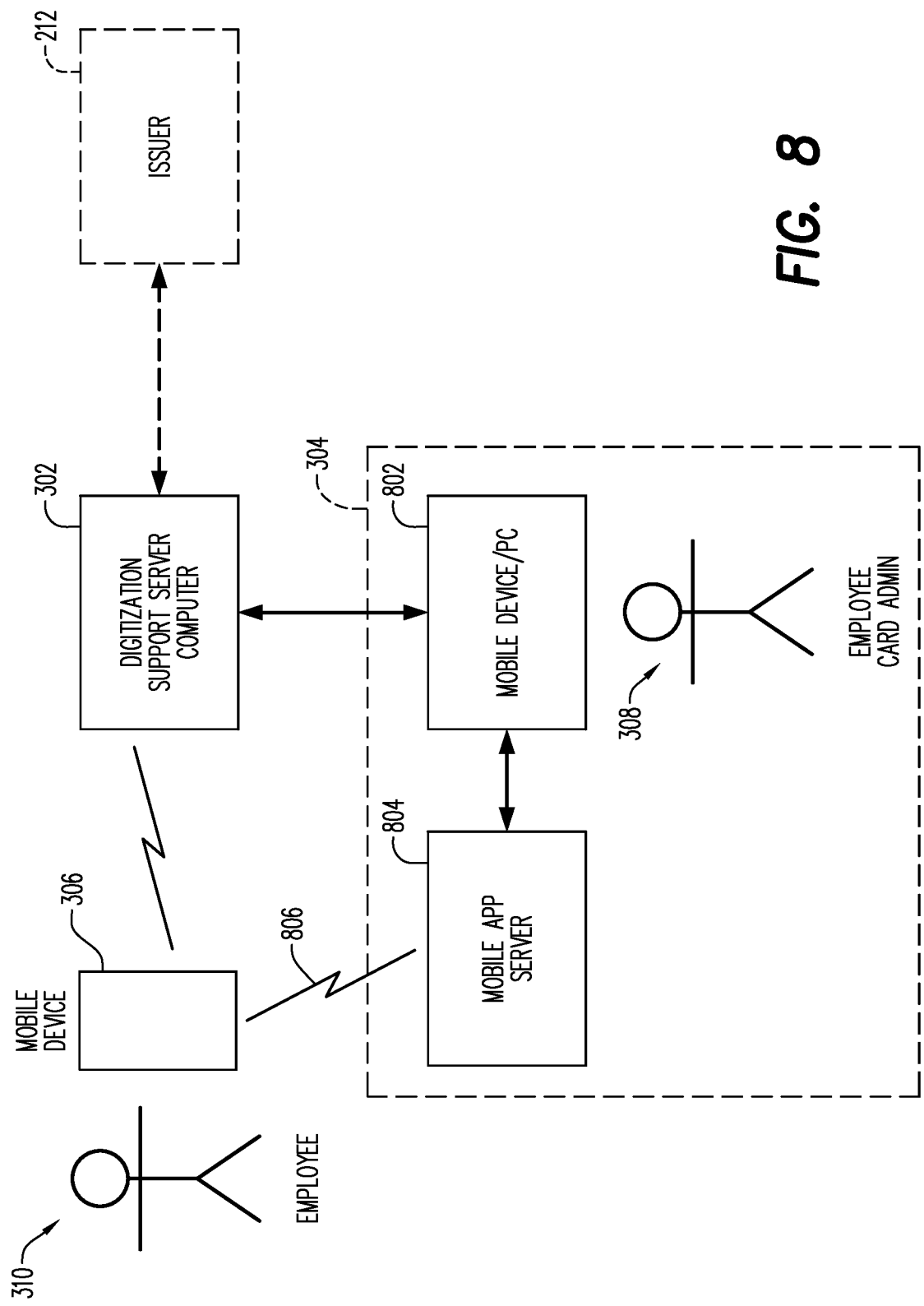

FIG. 8 is a block diagram that illustrates certain aspects of a payment system that may be provided according to teachings of the present disclosure and that may incorporate some or all of the elements of the payment systems illustrated in FIGS. 1 and 2. FIG. 8 may be viewed as still another variation on the arrangement of FIG. 3. The digitization support server computer 302, the employee mobile device 306, the employee 310 and the issuer 212 are shown, as before. A block that represents the account holder organization 304 is shown as incorporating an administrator 308, the administrator's computing device 802 (e.g., a smartphone/mobile device/PC, etc.), and a mobile app server 804. The mobile app server 804 may provide functionality to the account holder organization 304 in connection with distributing mobile apps to mobile devices operated by employees of the account holder organization 304. The mobile app server 804 may provide overall management and tracking of all apps supplied by the account holder organization 304 to its employees' mobile devices. One of the types of apps distributed by the mobile app server 804 may be a payment app suitable for programming the employees' mobile devices to be payment-enabled with payment tokens provisioned to the employees' mobile devices. Thus, "over the air" provisioning of a suitable app from the mobile app server 804 to the employee mobile app 306 is schematically indicated at 806. The arrangement of FIG. 8 may function in substantially the same manner as the arrangement of FIG. 3, except that in the arrangement of FIG. 8 the mobile device 306 receives the payment app from the account holder organization 304 via the mobile app server 804 rather than from the digitization support server computer 302 or an app store, etc.

Figure 9:
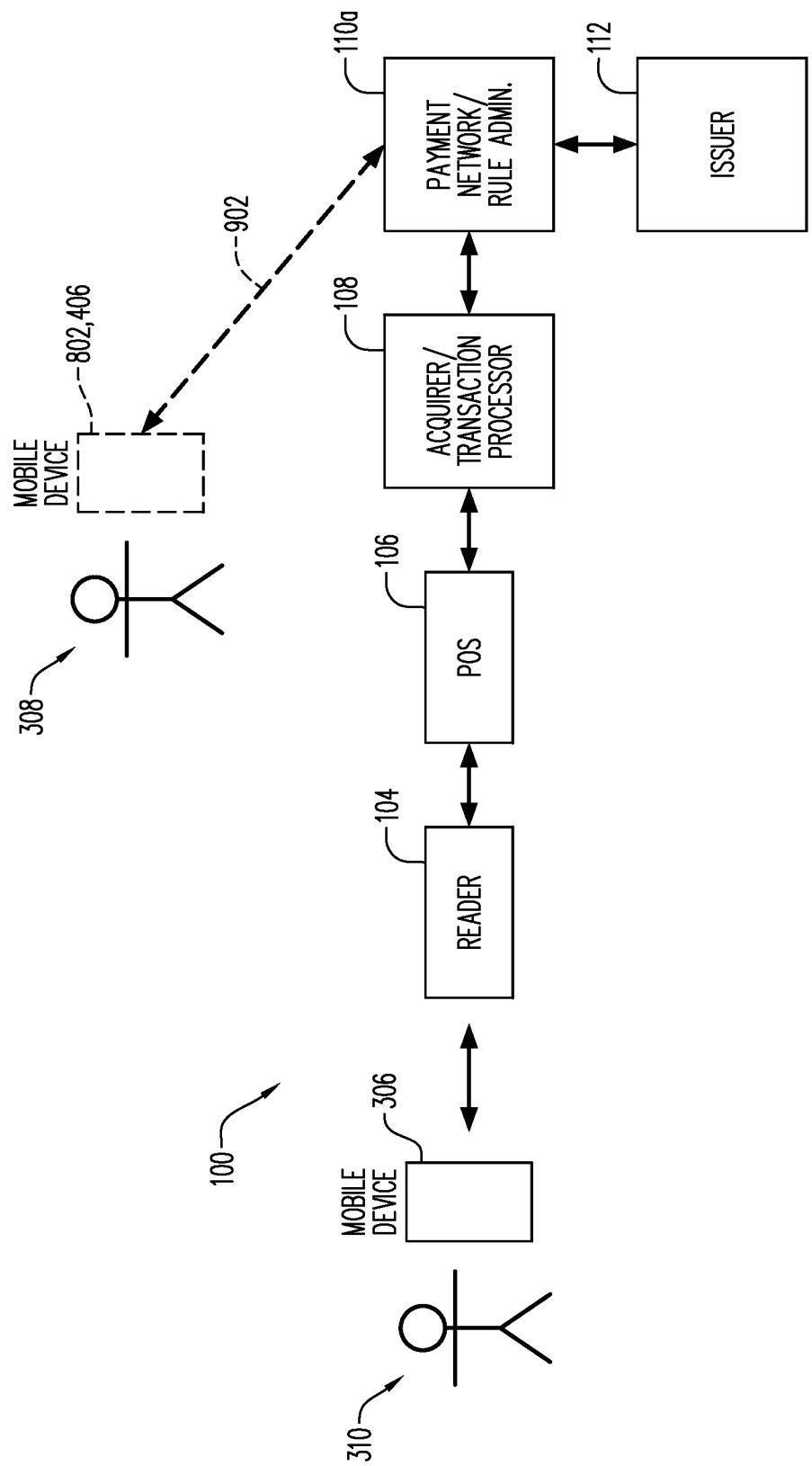

FIG. 9 is a block diagram that illustrates certain aspects of a payment system that may be provided according to teachings of the present disclosure and that may incorporate some or all of the elements of the payment systems illustrated in FIGS. 1 and 2. FIG. 9 may be viewed as a modification of the conventional payment system shown in FIG. 1, with adaptations to accommodate aspects of the present disclosure. It will be appreciated that FIG. 9 represents aspects of a payment system in regard to a purchase transaction, whereas FIGS. 3-8 primarily are concerned with arrangements for provisioning the employee's/child's mobile device with a payment token. In FIG. 9, the purchaser/initiator of the payment transaction is shown as being the employee 310, though alternatively the purchaser may be the child/family member referred to in connection with FIGS. 4 and 6. Continuing to refer to FIG. 9, the payment device is shown as the employee's payment-enabled mobile device 306, although alternatively the payment device may be the child mobile device 402 shown in FIGS. 4 and 6.

The reader 106 and the POS terminal 108 shown in FIG. 9 may have the same functions as described above in connection with FIG. 1. Block 108 may also have the same function as in FIG. 1, except that in FIG. 9 block 108 is re-labeled to illustrate that the role of the transaction acquirer may (as is a common practice) alternatively be performed by a transaction processor that represents the merchant's acquirer bank.

Block 110a in FIG. 9 represents the payment network. The payment network 110a may perform the same functions as the payment network 110 in FIG. 1; further, the payment network 110a may perform one or more additional functions related to aspects of the present disclosure. These additional functions may include storing and enforcing rules relating to use of payment tokens provisioned to mobile devices as discussed above. More details about types of rules and enforcement thereof will be provided below. The payment network 110a may be commonly operated with the digitization support server computer 302 shown in previous drawings and may co-operate with the digitization support server computer 302, at least for the purpose of storing and implementing account holder preferences/options communicated by account holders to the digitization support server computer 302 (or to an account issuer, as the case may be).

The additional functions of the payment network 110a may also include de-tokenization, as described, for example, in the above-referenced documents relating to tokenization standards/specifications. Moreover, the additional functions of the payment network 110a may include providing reports and/or transaction alerts to the account holder (indicated at 308 in FIG. 9; alternatively, the account holder may be an individual parent, as discussed in connection with FIGS. 4 and 6, rather than the account holder organization administrative employee as expressly indicated in FIG. 9). As another possible additional function of the payment network 110a, it may give the account holder the opportunity to approve/disapprove a current transaction that is being performed using a payment token linked to the account holder's payment account and provisioned to the mobile device 306 (or 402). In addition, the payment network 110a may store records of payment token transactions for reporting to account holders.

In providing alerts, reports, requests for transaction approval, etc., the payment network 110a may communicate with the account holder via a mobile device 802 (FIG. 8) or 406 (FIGS. 4 and 6), as the case may be. The communication between the payment network 110a and the mobile device 802 or 406 is indicated at 902 in FIG. 9.

Also shown in FIG. 9 is account issuer 112, which may have the same functions as in the system depicted in FIG. 1.

It should be generally understood with respect to each of the blocks in the above-described block diagrams that the block in question, in addition to representing an entity, may also represent a suitable computer, computing device, or other device with computing capabilities, suitably programmed to provide the functions ascribed to the entity in question.

Figure 10:
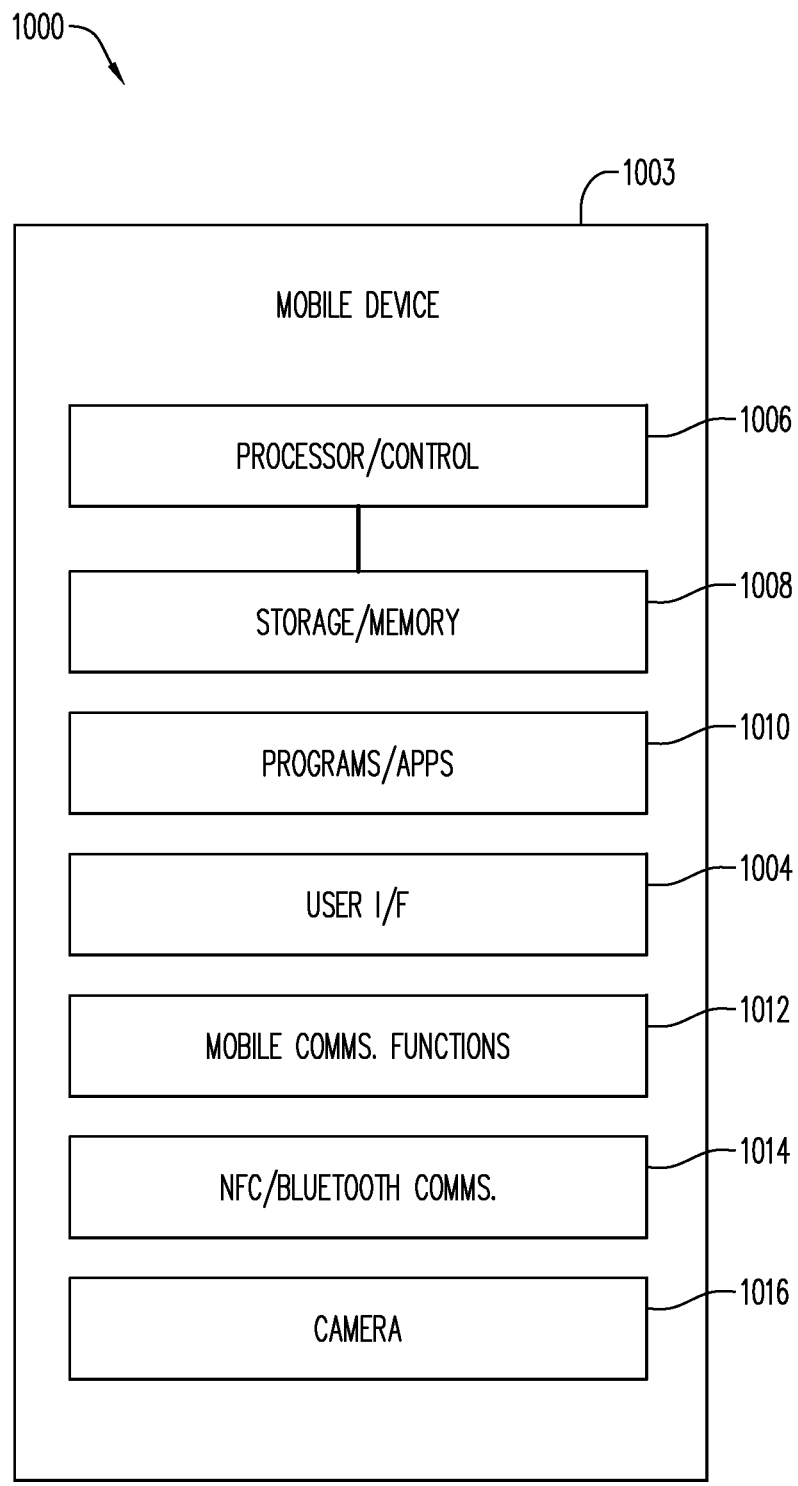
FIG. 10 is a block diagram that shows some features of a typical mobile device that may perform a role in one or more of the payment systems illustrated in FIGS. 3-9.

FIG. 10 is a block diagram that shows some features of a typical mobile device (e.g., items 306, 802, 402, 406, as shown in previously discussed drawing figures) that may perform a role in one or more of the payment systems illustrated in FIGS. 3-9. For convenience of reference, in connection with FIG. 10, the mobile device will be assigned the reference numeral 1000.

The mobile device 1000 may include a housing 1003. In many embodiments, the front of the housing 1003 is predominantly constituted by a touchscreen (not separately shown), which is a key element of the user interface 1004 of the mobile device 1000.

The mobile device 1000 further includes a mobile processor/control circuit 1006, which is contained within the housing 1003. Also included in the mobile device 1000 is a storage/memory device or devices (reference numeral 1008). The storage/memory devices 1008 are in communication with the processor/control circuit 1006 and may contain program instructions to control the processor/control circuit 1006 to manage and perform various functions of the mobile device 1000. As is well-known, a device such as mobile device 1000 may function as what is in effect a pocket-sized personal computer (assuming for example that the mobile device is a smartphone), via programming with a number of application programs, or "apps", as well as a mobile operating system (OS). (The apps are represented at block 1010 in FIG. 10, and may, along with other programs, in practice be stored in block 1008, to program the processor/control circuit 1006.) As is typical for mobile devices, the mobile device 1000 may include mobile communications functions as represented by block 1012. The mobile communications functions may include voice and data communications via a mobile communication network with which the mobile device 1000 is registered.

In addition, to facilitate use as a payment-enabled device, the mobile device 1000 may include short-range radio communications capabilities (block 1014), including for example NFC and/or Bluetooth. These capabilities may, in some use cases, also facilitate the mobile device's receipt of a payment token that is being provisioned to the mobile device 1000.

Also, like a typical smartphone, the mobile device 1000 may include a camera 1016.

Referring again to the apps 1010 that program the mobile device 1000, these may include a payment app and/or a wallet app. Where the mobile device 1000 is to receive provisioning of a payment token, the payment app may include one or more features to facilitate receipt of the payment token. Where the mobile device 1000 is to be used to initiate/facilitate provisioning of a payment token to another device, a suitable app for that purpose may be included among the apps 1010. Further, such an app may include further features that support rule-setting for the payment capabilities of the other mobile device, and for receiving reports, alerts, and/or requests to approve particular current payment transactions with respect to payment transaction activity of the other mobile device.

From the foregoing discussion, it will be appreciated that the blocks depicted in FIG. 10 as components of the mobile device 1000 may in effect overlap with each other, and/or there may be functional connections among the blocks which are not explicitly shown in the drawing. It may also be assumed that, like a typical smartphone, the mobile device 1000 may include a rechargeable battery (not shown) that is contained within the housing 1003 and that provides electrical power to the active components of the mobile device 1000.

It has been posited that the mobile device 1000 may be embodied as a smartphone, but this assumption is not intended to be limiting, as mobile device 1000 may alternatively, in at least some cases, be constituted by a tablet computer or by other types of mobile computing devices.

Figure 11:
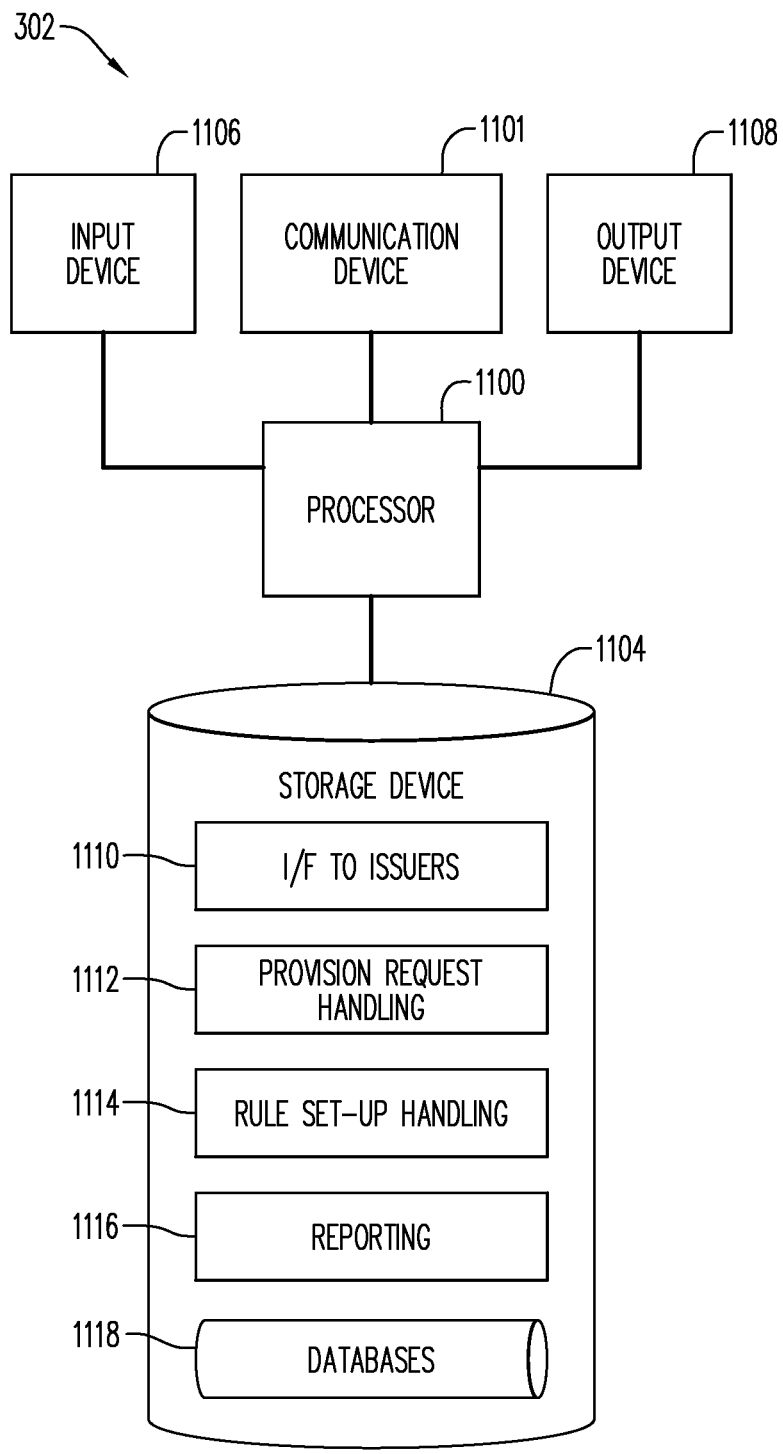
FIG. 11 is a block diagram that illustrates a computer system that may perform a role in one or more of the payment systems illustrated in FIGS. 3-9.

FIG. 11 is a block diagram that illustrates an example embodiment of the digitization support server computer 302. The digitization support server computer 302 may be constituted by server computer and/or mainframe computer hardware.

The digitization support server computer 302 may include a computer processor 1100 operatively coupled to a communication device 1101, a storage device 1104, an input device 1106 and an output device 1108. The computer processor 1100 may be in communication with the communication device 1101, the storage device 1104, the input device 1106 and the output device 1108.

The computer processor 1100 may be constituted by one or more processors. Processor 1100 operates to execute processor-executable steps, contained in program instructions described below, so as to control the digitization support server computer 302 to provide desired functionality.

Communication device 1101 may be used to facilitate communication with, for example, other devices (such as devices operated by account holders, administrators, employees of account holder organizations, etc.). For example communication device 1101 may comprise numerous communication ports (not separately shown), to allow the digitization support server computer 302 to communicate simultaneously with a large number of other devices and computers, including communications as required to receive and fulfill numerous requests to provision payment tokens to account holder organization employees and/or children or other family members of account holders.

Input device 1106 may comprise one or more of any type of peripheral device typically used to input data into a computer. For example, the input device 1106 may include a keyboard and a mouse. Output device 1108 may comprise, for example, a display and/or a printer.

Storage device 1104 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 1104 stores one or more programs for controlling processor 1100. The programs comprise program instructions (which may be referred to as computer readable program code means) that contain processor-executable process steps of the digitization support server computer 302, executed by the processor 1100 to cause the digitization support server computer 302 to function as described herein.

The programs stored by the storage device 1104 may include one or more operating systems (not shown) that control the processor 1100 so as to manage and coordinate activities and sharing of resources in the digitization support server computer 302, and to serve as a host for application programs that run on the digitization support server computer 302.

The storage device 1104 may also store a software interface 1110 that facilitates interaction between the digitization support server computer 302 and various computers operated by account issuers. Such interaction may be necessary, for example, when the digitization support server computer 302 is required to obtain consent from an account issuer before fulfilling a request to provision a payment token to a mobile device.

The storage device 1104 may further store a provisioning request handling application program 1112. The provisioning request handling application program 1112 may control the processor 1100 to enable the digitization support server computer 302 to handle payment token provisioning requests, as described herein.

Still further, the storage device 1104 may store a rule set-up handling application program 1114. The rule set-up handling application program 1114 may control the processor 1100 to enable the digitization support server computer 302 to interact with users (e.g., account holders and/or "corporate card" administrators) to permit the users to select and/or define rules to constrain use of the payment tokens that are provisioned to employee/child/family member mobile devices. The rule set-up handling application program may also program the digitization support server computer 302 to cause the rules selected/defined by the users to be stored and administered by a suitable component of the payment system, such as the payment network 110a (as per FIG. 9), or—in other embodiments—a token service provider such as the component 204 shown in FIG. 2. More details of the functionality provided through the rule set-up handling application program 1114 will be provided below.

In some embodiments, the digitization support server computer 302 may be a source of payment token activity reports for account holders. In such cases, the storage device 1104 may store a reporting program 1116 that programs the digitization support server computer 302 to provide suitable reporting functionality.

The storage device 1104 may further store database management programs and an internal reporting application (both not separately shown), the latter of which may respond to requests from computer system administrators for reports on the activities performed by the digitization support server computer 302; the storage device 1104 may also store communication software, device drivers, etc.

The storage device 1104 may also store one or more databases 1118 required for operation of the digitization support server computer 302.

Figure 12:
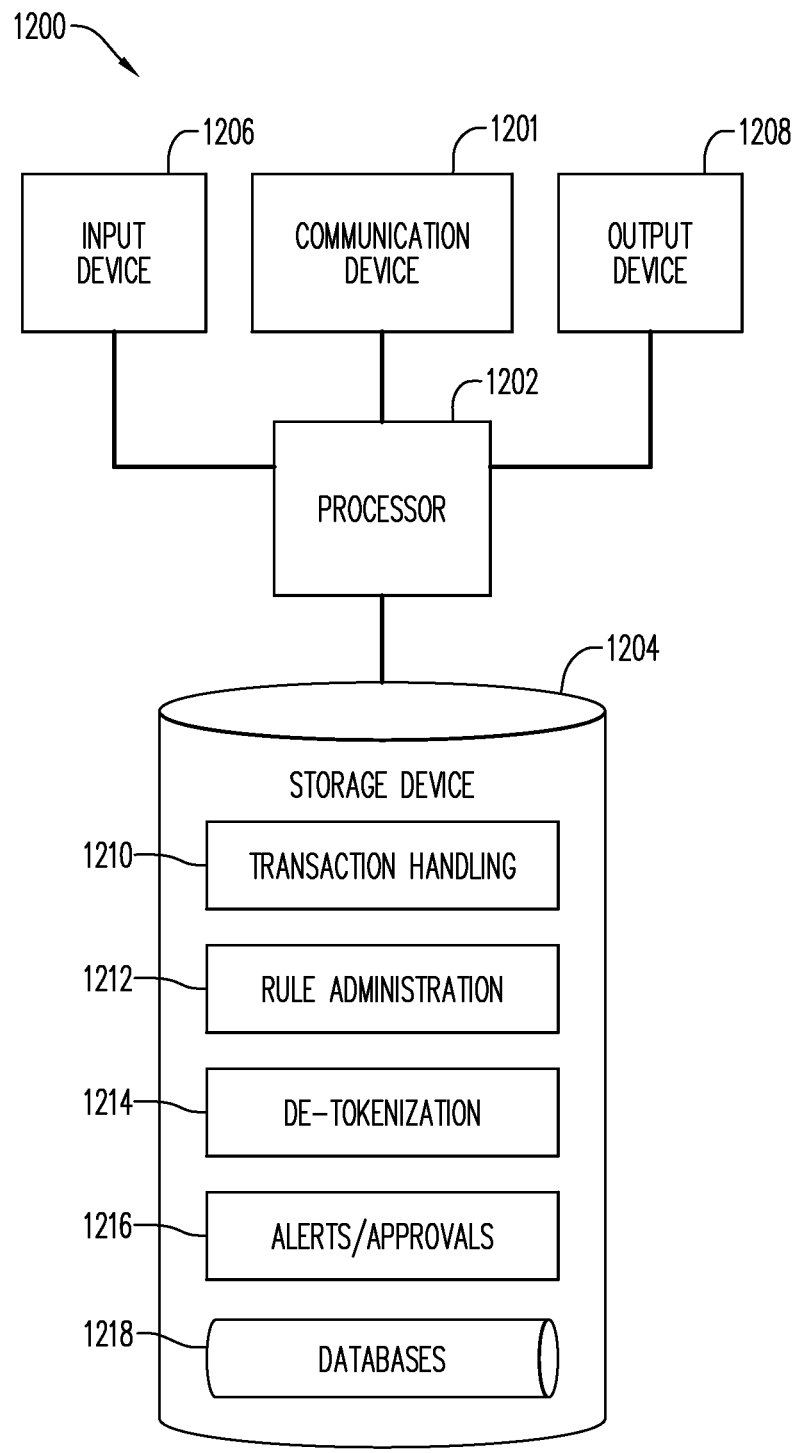
FIG. 12 is a block diagram that illustrates another computer system that may perform a role in one or more of the payment systems illustrated in FIGS. 3-9.

FIG. 12 is a block diagram illustration of a payment network computer 1200 that may implement functions of the payment network 110a shown in FIG. 9. The payment network computer 1200 may be constituted by server computer and/or mainframe computer hardware.

The payment network computer 1200 may include a computer processor 1202 operatively coupled to a communication device 1201, a storage device 1204, an input device 1206 and an output device 1208. The computer processor 1202 may be in communication with the communication device 1201, the storage device 1204, the input device 1206 and the output device 1208. The hardware architecture of the payment network computer 1200 may resemble that of the digitization support server computer 302 as described above, and the above description of components of the digitization support server computer 302 may also apply to like-named components of the payment network computer 1200.

Storage device 1204 stores one or more programs for controlling processor 1202. The programs comprise program instructions (which may be referred to as computer readable program code means) that contain processor-executable process steps of the payment network computer 1200, executed by the processor 1202 to cause the payment network computer 1200 to function as described herein.

The programs stored by the storage device 1204 may include one or more operating systems (not shown) that control the processor 1202 so as to manage and coordinate activities and sharing of resources in the payment network computer 1200, and to serve as a host for application programs that run on the payment network computer 1200.

The storage device 1204 may also store a transaction handling application program 1210 that programs the processor 1202 to control the payment network computer 1200 such that it is enabled to handle payment transactions, including routing of transaction authorization request messages and transaction authorization response messages, as occurs in a conventional payment network. Moreover, the transaction handling application program 1210 may support additional functionality of the payment network computer 1200 such that it performs supplemental transaction handling functions in accordance with aspects of this disclosure.

In addition, the storage device 1204 may store rule administration software 1212. The rule administration software 1212 may program the processor 1202 to control the payment network computer 1200 to store and apply rules defined and/or selected by account holders to constrain use of payment tokens linked to their payment accounts.

Further, the storage device 1204 may store a de-tokenization software module 1214. The de-tokenization software module 1214 may program the processor 1202 to control the payment network computer 1200 to perform "de-tokenization" (i.e., translation of payment tokens into the corresponding PANs) in accordance with applicable tokenization standards and/or specifications. As is understood by those who are skilled in the art, this may involve interaction with a "token vault" such as that shown at 210 in FIG. 2.

Continuing to refer to FIG. 12, the storage device 1204 may also store an alerts and/or approvals application program 1216. The application program 1216 may program the processor 1200 to control the payment network computer 1200 such that the payment network computer 1200 provides functionality, as described herein, in regard to alerts and/or account holder approvals with respect to transactions performed using payment tokens that have been provisioned to employee/child/family member mobile devices.

The storage device 1204 may further store database management programs and an internal reporting application (both not separately shown), the latter of which may respond to requests from computer system administrators for reports on the activities performed by the payment network computer 1200; the storage device 1204 may also store communication software, device drivers, etc.

The storage device 1204 may also store one or more databases 1218 required for operation of the payment network computer 1200.

Figure 13:
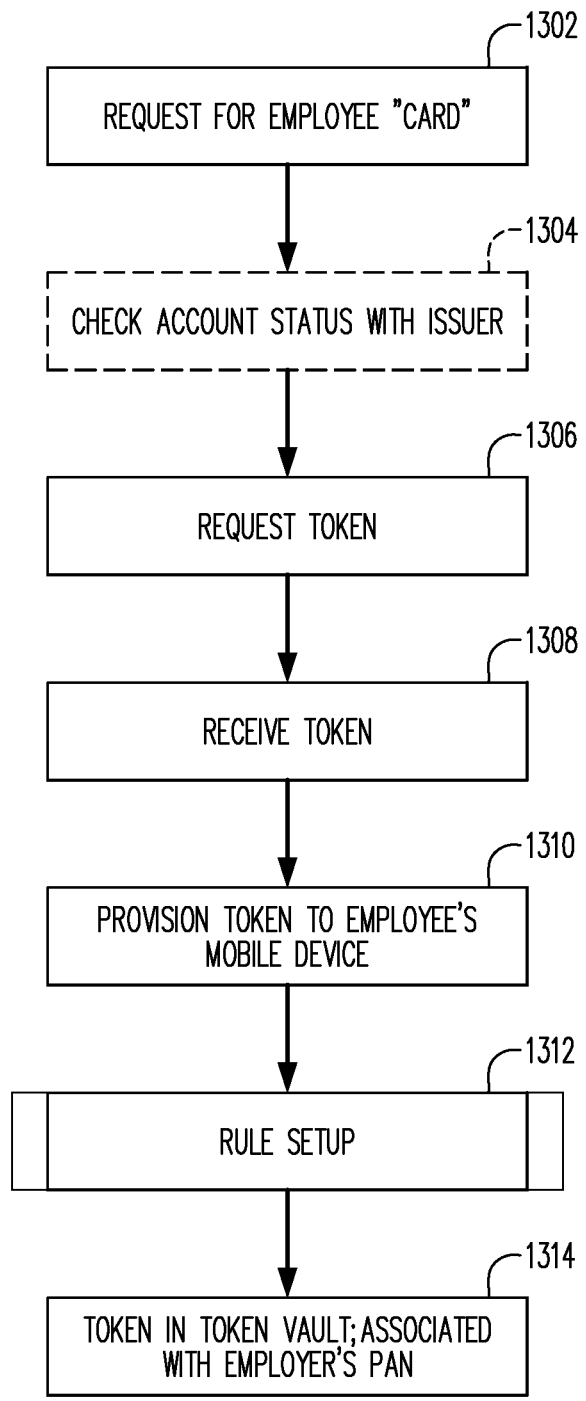
FIGS. 13 and 14 are flow charts that illustrate processes that may be performed in accordance with aspects of the present disclosure in one or more of the payment systems illustrated in FIGS. 3-9.

FIG. 13 is a flow chart that illustrates a process that may be performed in accordance with aspects of the present disclosure. In particular, FIG. 13 is illustrative of a process in which a payment token is provisioned to an employee's mobile device in an arrangement such as that shown in FIG. 3, 7 or 8. The process as depicted in FIG. 13 assumes that the mobile device 306 (FIG. 3, e.g.) that is to be provisioned with the payment token has already been loaded with a suitable payment app to receive and employ the payment token. This may have occurred, for example, through downloading of such a payment app from the mobile app server 804 in the arrangement as shown in FIG. 8. Alternatively, the mobile device 306 may have been used to download the payment app from an app store, or the like. As another alternative, not illustrated in the drawing, the downloading of the payment app to the mobile device 306 may be via the digitization support server computer 302, and may be part of the provisioning process. The downloading of the payment app to the mobile device 306 may have been initiated by the employee 310, or alternatively the digitization support server computer 302 or the mobile app server 804 may have "pushed" the app to the mobile device 306. In some embodiments, a wallet app, as well as a payment app, may be loaded into the mobile device 306.

At 1302 in FIG. 13, the digitization support server computer 302 receives a provisioning request. In informal terms, this may be referred to as providing an employee with a company payment "card"; in accordance with aspects of the present disclosure, this is a request to provision a payment token to the employee's mobile device 306 to make the mobile device 306 fully payment-enabled. From previous discussion, it will be understood that the digitization support server computer 302 may receive this request from the applicable administrator 308 employed by the account holder organization 304 that employs the employee 310.

In some embodiments, the provisioning request may specify the relevant departmental or organizational payment account by PAN. The provisioning request may further specify the mobile telephone number for the mobile device 306 (thereby identifying the mobile device). The employee 310 may be identified by name and job title and/or job code. In some embodiments, the request may explicitly identify the department to which the employee belongs.

In some embodiments, security and user authentication with respect to the administrator 308 may be such, and the convention between the digitization support server computer 302 and the account issuer may be such, that the digitization support server computer 302 is not required to obtain approval from the account issuer before fulfilling the provisioning request. For example, strong communication channel security and mutual authentication between the digitization support server computer 302 and the payment account administrator 308 for the organization 304 may be in place to support provisioning fulfillment without direct account issuer approval for each request. In some embodiments, moreover, the payment account administrator may be, for example, a trusted departmental finance staff member or a trusted member of the central finance staff for the organization 304.

Alternatively, however, the digitization support server computer 302 may (as indicated at block 1304 in FIG. 13) check in with the account issuer for the organization's payment account(s) to confirm the status of the payment account for which the payment token is being issued, and/or to allow the account issuer to perform ID&V or take other security measures with respect to the requesting payment account administrator 308 and/or the computing device through which the payment account administrator 308 is submitting the provisioning request.

Assuming that the account issuer 212 (FIG. 3) approves the provisioning request or that no such approval was required, then block 1306 in FIG. 13 may follow block 1302 or block 1304, as the case may be. At block 1306, the digitization support server computer 302 may request a payment token from the token service provider 204 (FIG. 2) for provisioning to the employee mobile device 306. In doing so, the digitization support server computer 302 may identify the relevant PAN, i.e., the PAN that identifies the payment account to which the payment token will be linked.

Block 1308 may follow block 1306 in the process of FIG. 13. At block 1308, the digitization support server computer 302 may receive the requested payment token from the token service provider 204.

Block 1310 may follow block 1308 in the process of FIG. 13. At block 1310, the digitization support server computer 302 may provision the payment token received at 1308 to the employee mobile device 306. This may involve, for example, an interaction "over the air" between the digitization support server computer 302 and the payment app previously loaded into the mobile device 306. The interaction may involve transmission over the air of the payment token from the digitization support server computer 302 to the mobile device 306.

In some embodiments, the processing at block 1310 may involve authentication of the mobile device 306 or of the payment app in the mobile device which is to receive the payment token. In some embodiments, for example, the original provisioning request at 1302 may have included data to identify the device by device I.D. or to identify the copy of the payment app (e.g., if it has been downloaded to the mobile device 306 via the mobile app server 804 (FIG. 8)) to aid the digitization support server computer 302 in authenticating the particular device and/or copy of the app.

Block 1312 may follow block 1310 in the process of FIG. 13. Block 1312 is concerned with establishing rules that may govern or constrain the use of the payment token for payment transactions. Details of an embodiment of the processing at block 1312 will be described below in connection with FIGS. 14 and 15.

Block 1314 may follow block 1312 in the process of FIG. 13. At block 1314, the digitization support server computer 302 may arrange that the payment token provisioned at 1310 to the mobile device 306 is stored in the token vault 210 (FIG. 2) in association with the relevant PAN. Consequently, in payment transactions utilizing the payment token and the payment-enabled mobile device 306, the de-tokenization stage of the transaction will result in translation of the payment token to the relevant PAN.

Figure 14:
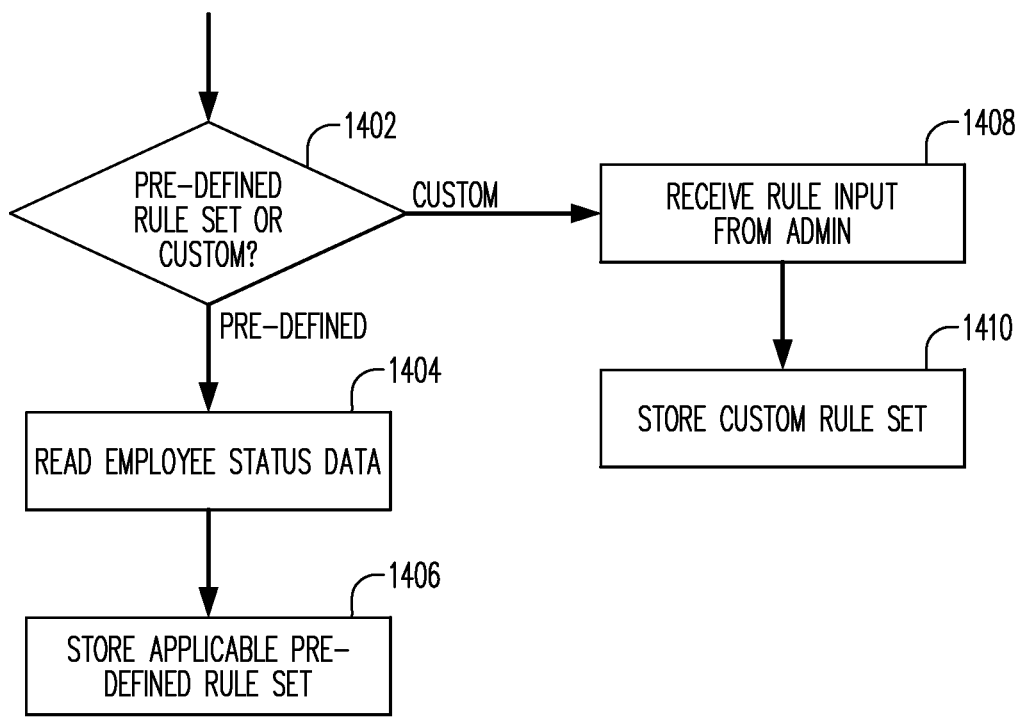

FIG. 14 is a flow chart that illustrates an example process that may be performed in accordance with aspects of the present disclosure. In particular, FIG. 14 illustrates an example embodiment of block 1312 in FIG. 13. That is, FIG. 14 illustrates an example set-up process for rules to govern or constrain the use of the payment token provisioned at 1310.

The process of FIG. 14 may begin with a decision block 1402. At decision block 1402, the digitization support server computer 302 may determine whether the set of rules to be applied to use of the payment token is to be a pre-defined set of rules or a custom set of rules. The digitization support server computer 302 may make this determination in accordance with a preference indicated by the administrator 308 in interacting with the digitization support server computer 302. Alternatively, the digitization support server computer 302 may make this determination based on the job title or job code for the employee 310 and in the absence of any countervailing indication from the administrator 308.

If the digitization support server computer 302 determines at decision block 1402 that a pre-defined set of rules is to be applicable, then block 1404 may follow decision block 1402 in the process of FIG. 14. At block 1404, the digitization support server computer 302 may read data indicative of the status or classification of the employee 310. This data may, for example, have been included in the provisioning request received at block 1302 in FIG. 13. For example, this data may indicate a job code and/or job title for the employee 310.

Block 1406 may follow block 1404 in the process of FIG. 14. At block 1406, the digitization support server computer 302 may cause a set of rules to be stored that has been predefined for the type of employee indicated by the employee status or classification that was read at block 1404.

As one example, for employees classified as field sales representatives, the rules governing their use of their payment-enabled mobile phones (provisioned with payment tokens as described above), may include rules such as (a) a daily $250 limit on transactions; (b) permitted use at any gas station; (c) permitted use at any restaurant; (d) approval required for use at any type of merchant other than a gas station or a restaurant.

As another example, for IT department employees assigned to purchase access to application programs on occasion, the rules may permit use of their payment tokens only for transactions with certain specified software vendors and app stores.

For employees classified as purchasing agents for office supplies, the rules may permit up to $10,000 per day in total transactions, but may require that the payment token be used only with certain approved vendors.

Other possible types of sets of pre-defined rules will be apparent from the above discussion and the examples provided above.

Referring again to decision block 1402, if the digitization support server computer 302 determines (e.g., based on the administrator's indicated preference) that a custom set of rules is to apply to use of the payment token provisioned at 1310, then block 1408 may follow decision block 1402 in the process of FIG. 14.

Figure 15:
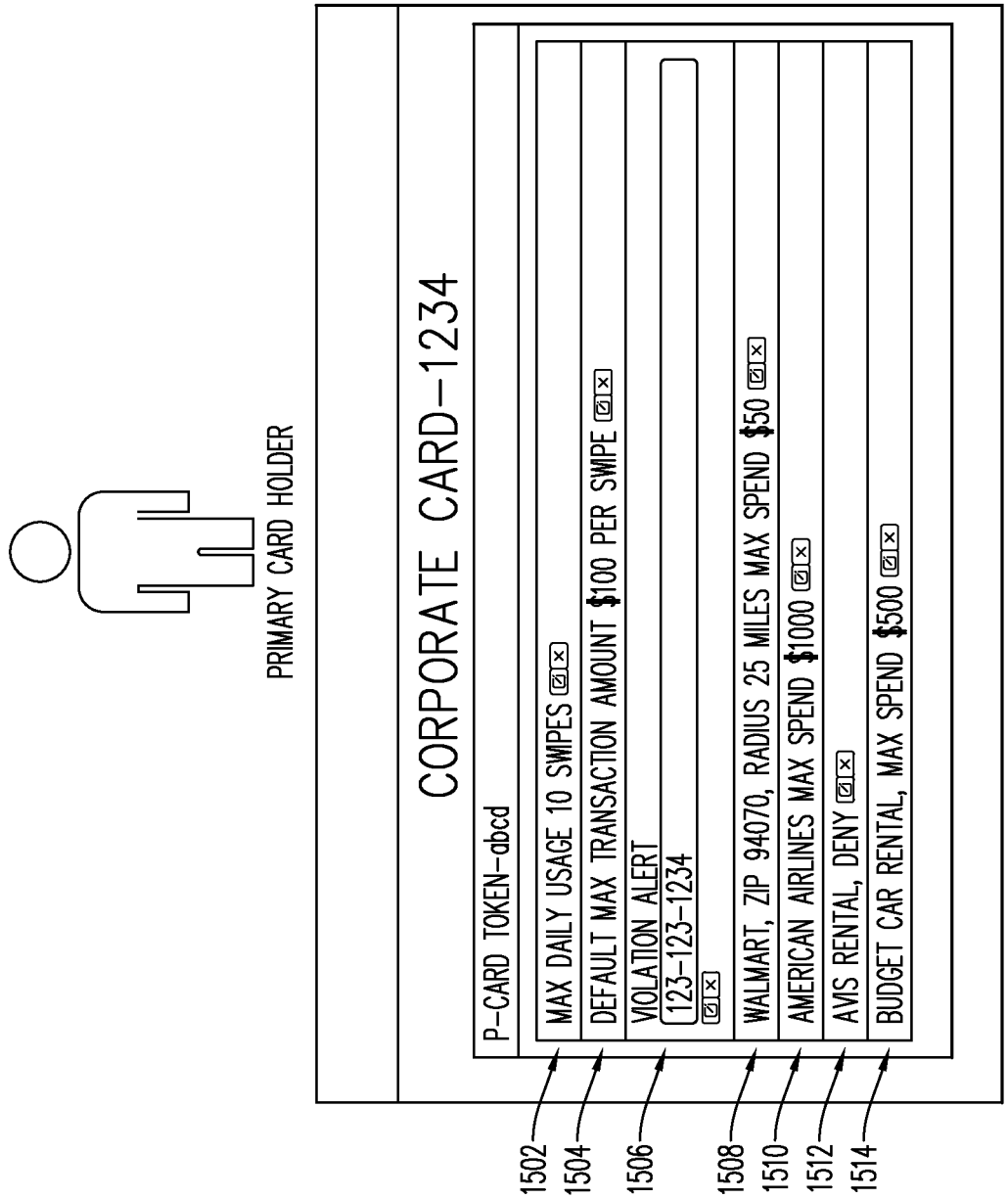
FIG. 15 shows a simplified example user interface screen display that may be provided in connection with the process illustrated in FIG. 14.

At block 1408, the administrator 308 may provide specific input to the digitization support server computer 302 to define the rules to be applicable to use of the just-provisioned payment token. FIG. 15 is an example screen display that may be presented to the administrator 308 to allow the administrator to provide input for defining a custom set of rules. Reference will now be made to various portions of the example display illustrated in FIG. 15.

For example, at 1502, the administrator 308 may set a maximum number of transactions ("swipes") for which the payment token may be used on any given day.

At 1504, the administrator 308 may set a maximum amount per transaction.

At 1506, the administrator 308 may indicate the mobile telephone number of a mobile device (e.g., for the administrator's own smartphone or the phone of a "duty officer" for the finance department) to receive alerts on occasions when the payment token is used or attempted to be used in violation of the applicable set of rules.

At 1508, for a particular retailer, and within a particular geographical area, a maximum spend limit may be set by the administrator 308.

At 1510, for a particular airline, the administrator 308 may set a maximum spend limit.

At 1512, the administrator 308 may define a rule that forbids use of the payment token at a particular car rental company.

At 1514, for a different car rental company, the administrator 308 may set a maximum spend limit.

Referring again to FIG. 14, block 1410 may follow block 1408. At block 1410, the digitization support server computer 302 may cause a set of rules to be stored in accordance with the input provided at 1408 by the administrator 308.

In the process of FIG. 13, the definition or selection of rules constraining use of the payment token has been portrayed as occurring after provisioning of the token; however, in other embodiments, the order of rule selection/definition versus token provisioning may be reversed.

Figure 16:
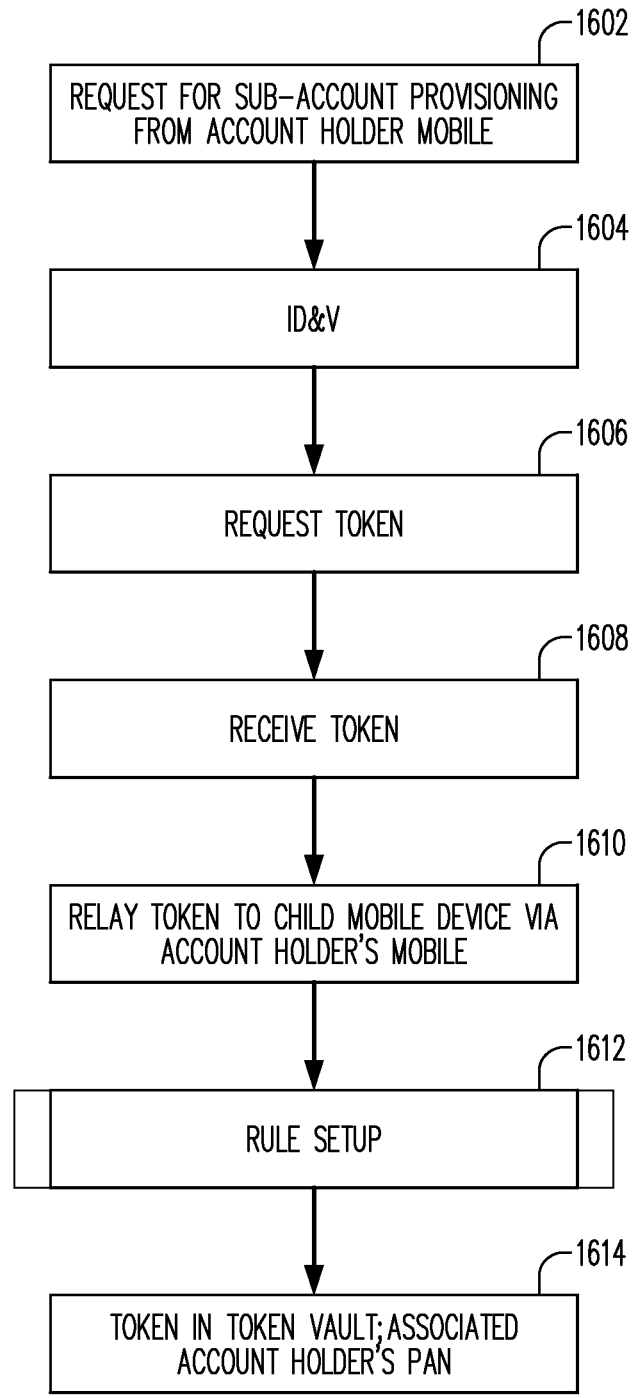
FIGS. 16-18 are flow charts that illustrate processes that may be performed in accordance with aspects of the present disclosure in one or more of the payment systems illustrated in FIGS. 3-9.

FIG. 16 is a flow chart that illustrates a process that may be performed in accordance with aspects of the present disclosure. In particular, FIG. 16 is illustrative of a process in which a payment token is provisioned to a child's or family member's mobile device in an arrangement such as that shown in FIG. 4.

At 1602 in FIG. 16, the digitization support server computer 302 receives a provisioning request. In informal terms, this may be referred to as providing a child/family member with a payment "card" linked to (providing access to) an account holder's payment account; in accordance with aspects of the present disclosure, this is a request to provision a payment token to the child's mobile device 402 as part of making the mobile device 402 payment-enabled. From previous discussion, it will be understood that the digitization support server computer 302 may receive this request from the account holder via the account holder's mobile device 406 (FIG. 4). A suitable app to support this functionality in the account holder's mobile device 406 may have previously been downloaded to the account holder's mobile device 406.

Block 1604 may follow block 1602 in the process of FIG. 16. At block 1604, the digitization support server computer 302 may make the account issuer 212 (FIG. 4) aware of the provisioning request, so that the account holder 212 may undertake a suitable ID&V process in regard to the account holder who has just submitted the provisioning request. Assuming that the ID&V process is completed successfully (or, alternatively, assuming that the digitization support server computer 302 has successfully completed a prescribed user authentication process with respect to the account holder), then block 1606 in FIG. 16 may follow block 1604. At block 1606, the digitization support server computer 302 may request a payment token from the token service provider 204 (FIG. 2) for provisioning to the child mobile device 402 (FIG. 4). In doing so, the digitization support server computer 302 may identify the relevant PAN, i.e., the PAN that identifies the (account holder's) payment account to which the payment token will be linked.

Block 1608 may follow block 1606 in the process of FIG. 16. At block 1608, the digitization support server computer 302 may receive the requested payment token from the token service provider 204.

Block 1610 may follow block 1608 in the process of FIG. 16. At block 1610, the digitization support server computer 302 may transmit the payment token to the account holder's mobile device 406 to permit the account holder's mobile device 406 to re-transmit the payment token to the child's mobile device 402.

Figure 17:
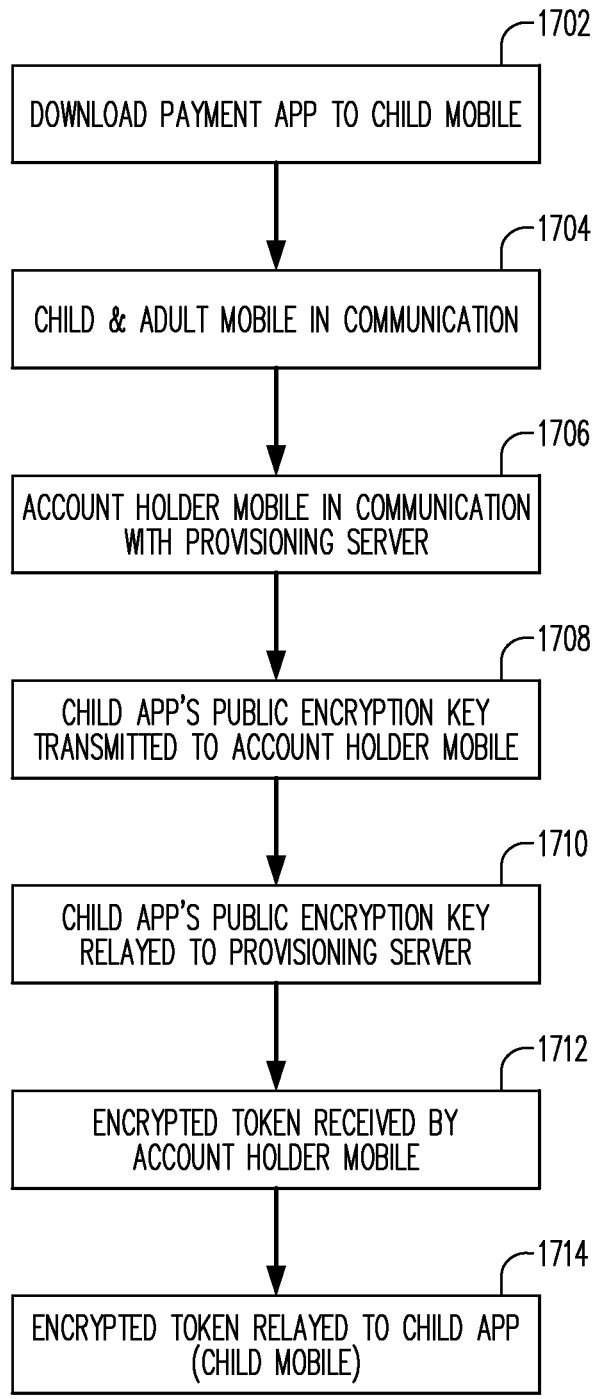

Reference will now be made to FIG. 17 to describe one example of a manner in which the processing of block 1610 may be performed.

In the process of FIG. 17, a suitable payment app may be downloaded to the child's mobile device 402, as indicated at block 1702. For example, to accomplish this, the child's mobile device 402 may be operated to access an app store. Alternatively, the digitization support server computer 302 may provide a feature that may be accessed by prospective "target" mobile devices to download a suitable payment app. The downloaded app is represented by block 404 in FIG. 4.

Continuing to refer to FIG. 17, block 1704 may follow block 1702 or may be performed in conjunction with block 1702. At block 1704, the child's mobile device 402 may be placed in proximity to the account holder's mobile device 406, and the mobile devices 402 and 406 may be placed in a condition to exchange short-range radio data communication messages with each other via, for example, NFC or Bluetooth. In particular, via a short-distance radio link the app 404 in the child's mobile device 402 may be in communication with the app 408 in the account holder's mobile device 406. Also in connection with block 1704, the payment app in the child's mobile device 402 may be placed in a condition or state such that it is prepared to receive/participate in receipt of provisioning of a payment token.

Referring again to FIG. 17, block 1706 indicates that the account holder's mobile device 406 is or remains in communication with the digitization support server computer 302, e.g., via the app 408 in the account holder's mobile device 406.

At block 1708 in FIG. 17, the child's mobile device 402/app 404 may transmit the public encryption key for the app 404 to the account holder's mobile device 406 and the app 408 in the mobile device 406; it will be understood that the account holder's mobile device 406 and the app 408 may receive the transmission of the public encryption key for the app 404.

At block 1710, the account holder's mobile device 406/app 408 may relay/re-transmit the public encryption key for the app 404 to the digitization support server computer 302.

In a step not explicitly shown in FIG. 17, the digitization support server computer 302 encrypts—with the public encryption key for the app 404—the payment token to be provisioned to the child's mobile device 402, and as a result the payment token is placed in an encrypted form. In that form (perhaps with one or more additional layers of encryption) the digitization support server computer 302 may transmit the payment token to the account holder's mobile device 406/app 408. As indicated at block 1712 in FIG. 17, the account holder's mobile device 406/app 408 may receive the encrypted payment token from the digitization support server computer 302. It is to be noted that the account holder's mobile device 406/app 408 may lack the secret encryption key required to reverse the encryption implemented with the public encryption key for the app 404; consequently, the actual "in the clear" version of the payment token may not be accessible to the account holder's mobile device 406/app 408.

At block 1714 in FIG. 17, the account holder's mobile device 406/app 408 may relay (re-transmit) the encrypted payment token to the child's mobile device 402/app 404. In a step not explicitly shown in FIG. 17, the child's mobile device 402/app 404 may decrypt the encrypted payment token and install the decrypted payment token in the app 404, thereby completing the provisioning of the payment token to the child's mobile device 402 via the account holder's mobile device 406. Consequently, the child's mobile device 402 is now payment-enabled and equipped to use the payment token for purchase transactions.

Referring again to FIG. 16, block 1612 may follow block 1610. Block 1612 is concerned with establishing rules that may govern or constrain the use of the payment token for payment transactions. Details of an embodiment of the processing at block 1612 will be described below in connection with FIGS. 18 and 19.

Block 1614 may follow block 1612 in the process of FIG. 16. At block 1614, the digitization support server computer 302 may arrange that the payment token provisioned at 1610 to the child's mobile device 402 is stored in the token vault 210 (FIG. 2) in association with the relevant PAN (i.e., in association with the PAN that identifies the payment account of the account holder who is the user of the mobile device 406). Consequently, in payment transactions utilizing the payment token and the payment-enabled mobile device 402, the de-tokenization stage of the transaction will result in translation of the payment token to the relevant PAN.

In example embodiments of the process of FIG. 16 as described above, the mobile device 406 communicated data (such as an encrypted payment token) to the mobile device 402 via NFC, Bluetooth, or the like. Alternatively, however, transfer of data to the mobile device 402 may occur by the mobile device 406 displaying a barcode such as a QR code, and the mobile device scanning/reading the barcode.

Figure 18:
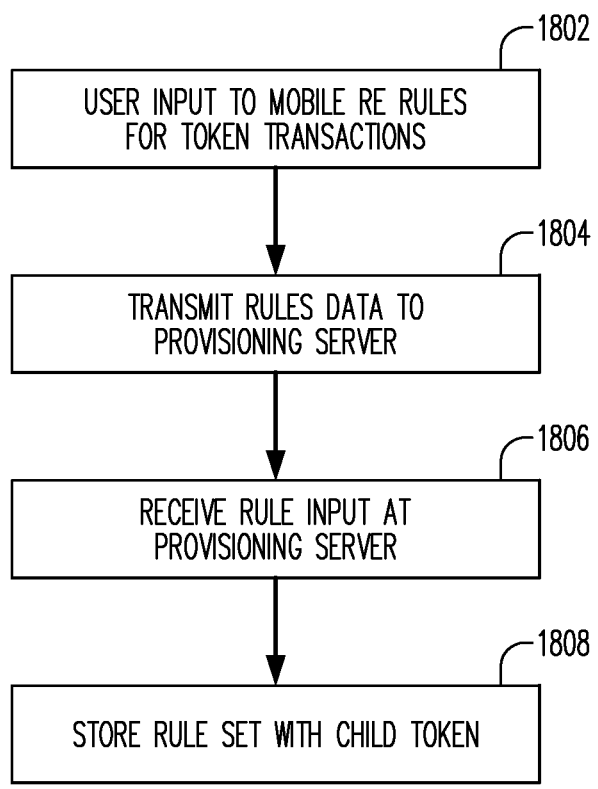

FIG. 18 is a flow chart that illustrates an example embodiment of the processing that may occur at block 1612 in FIG. 16.

At block 1802 in the process of FIG. 18, the account holder may use his/her mobile device 406 to interact with the digitization support server computer 302 (e.g., via the app 408 in the mobile device 406, perhaps via an appropriate API) to provide input to the digitization support server computer 302 concerning rules that are to constrain use of the payment token that was provisioned to the child's mobile device 402.

Figure 19:
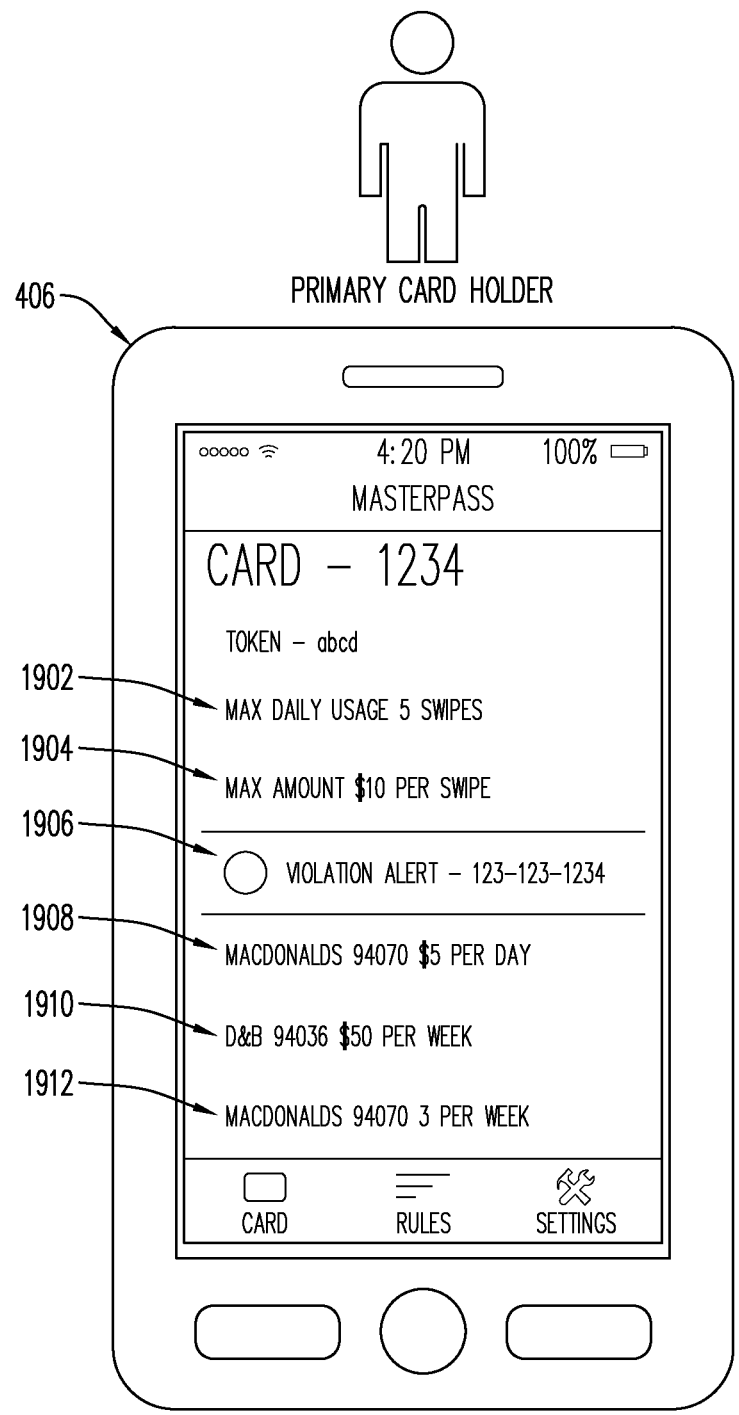
FIG. 19 shows a simplified example user interface mobile screen display that may be provided in connection with the process illustrated in FIG. 18.

FIG. 19 is an example screen display that may be presented to the account holder to allow the account holder to provide input for defining a set of rules to constrain use of the payment token provisioned at block 1610. Reference will now be made to various portions of the example display illustrated in FIG. 19.

For example, at 1902, the account holder may set a maximum number of transactions ("swipes") for which the payment token may be used on any given day.

At 1904, the account holder may set a maximum amount per transaction.

At 1906, the account holder may indicate the mobile telephone number of a mobile device (e.g., for the account holder's mobile device 406) to receive alerts on occasions when the payment token is used or attempted to be used in violation of the applicable set of rules.

At 1908, for a particular merchant/retailer, a maximum daily spend limit may be set by the account holder.

At 1910, for another merchant/retailer, the account holder may set a maximum weekly spend limit.

At 1912, for the same merchant referenced at 1908, the account holder may set a maximum limit on the number of transactions per week.

In some embodiments, the account holder may be allowed to define rules with an expiration date, i.e., rules that will be in effect starting at the present time, and then will expire and cease to be in effect on the expiration date.

Referring again to FIG. 18, block 1804 may follow or be associated with block 1802. At block 1804—via the account holder's interaction with the app 408, and the app's interaction with the digitization support server computer 302, data indicative of the desired rules is transmitted from the account holder's mobile device 406 to the digitization support server computer 302. As indicated at block 1806 in FIG. 18, the digitization support server computer 302 may receive the transmitted data regarding the account holder's definition of rules for use of the payment token.

Block 1808 may follow block 1806 in the process of FIG. 18. At block 1808, the digitization support server computer 302 may cause a set of rules to be stored in accordance with the input provided by the account holder and in association with a data record relating to the payment token provisioned at block 1610.

In the process of FIG. 16, the definition of rules constraining use of the payment token has been portrayed as occurring after provisioning of the token; however, in other embodiments, the order of rule definition versus token provisioning may be reversed.

Figure 20:
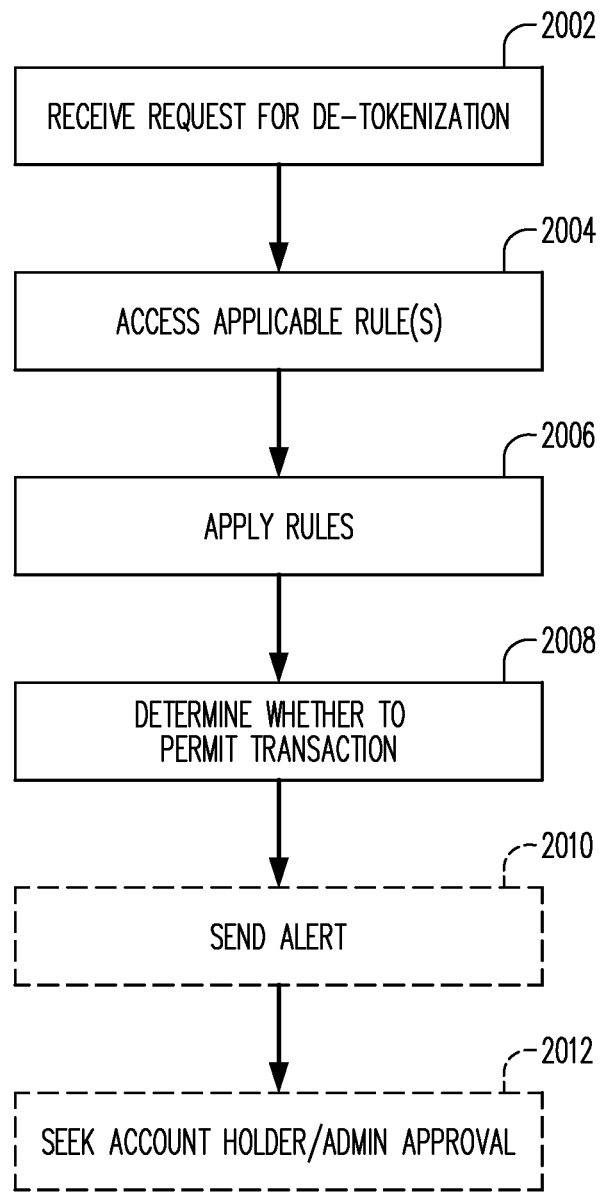
FIG. 20 is a flow chart that illustrates a process that may be performed in accordance with aspects of the present disclosure in one or more of the payment systems illustrated in FIGS. 3-9.

FIG. 20 is a flow chart that illustrates an example process that may be performed in accordance with aspects of the present disclosure. In particular, FIG. 20 is concerned with handling of a particular payment transaction for which a payment token (as provisioned to an employee/child/family member mobile device pursuant to FIG. 13 or 16) is to be used. The processing depicted in FIG. 20 may be performed by or in association with the payment network 110a (FIG. 9) and/or the token service provider 204 (FIG. 2). Without meaning to foreclose other possibilities, it will be assumed for the discussion of FIG. 2 that the processing is performed at the token service provider 204. To a considerable extent, the processing depicted in FIG. 20 is concerned with administration/enforcement of the sort of rules established by processes like those depicted in FIGS. 14 and 18.

Referring, then, to FIG. 20, at block 2002 the token service provider 204 may receive a de-tokenization request with respect to a current transaction undertaken with the payment-enabled mobile device 306 or 402. It may be assumed that up to that point, transaction processing has occurred generally in accordance with the transaction model illustrated in FIG. 1 and/or in accordance with tokenization standards or specifications as referred to above.

Block 2004 may follow block 2002 in the process of FIG. 20. At block 2004, the token service provider 204 may access a set of usage rules that has been stored with respect to the payment token for which it is now desired to obtain translation to a PAN.

Block 2006 may follow block 2004 in the process of FIG. 20. At block 2006, the token service provider 204 may apply the rules accessed at 2004 to the transaction at hand. Then, at 2008, based on the rules, the token service provider 204 may determine whether, in accordance with the rules, the proposed transaction is permissible. (If so, it may be presumed that the transaction is completed, or at least de-tokenization is completed and a suitable transaction authorization request message is sent on for approval by the account issuer.)

Moreover, as indicated at block 2010, if called for by an applicable rule, the token service provider 204 may send an alert concerning the pending transaction to the account holder/account holder organization, as the case may be.

Also, as indicated at block 2012, if called for by an applicable rule, the token service provider may request the account holder/account holder organization to approve the pending transaction. The request may take the form of a text message, in-app communication, etc. In some embodiments, the token service provider 204 (or payment network, as the case may be) may defer processing/routing the transaction for a short time to give the individual who received a request an opportunity to respond.

In a branch of the process not explicitly shown in the drawing, if an applicable rule indicates that the transaction is not permissible, the token service provider may cause the transaction to be declined. In some embodiments and/or in some situations, the token service provider 204 may cause a notice of the declined transaction to be sent to the account holder/account holder organization.

FIGS. 21-24 are simplified example mobile screen displays that may be provided to a parent payment account holder in accordance with aspects of the present disclosure. That is, the screen displays of FIGS. 21-24 may be relevant to the situations otherwise illustrated in FIGS. 4 and 6.

Figure 21:
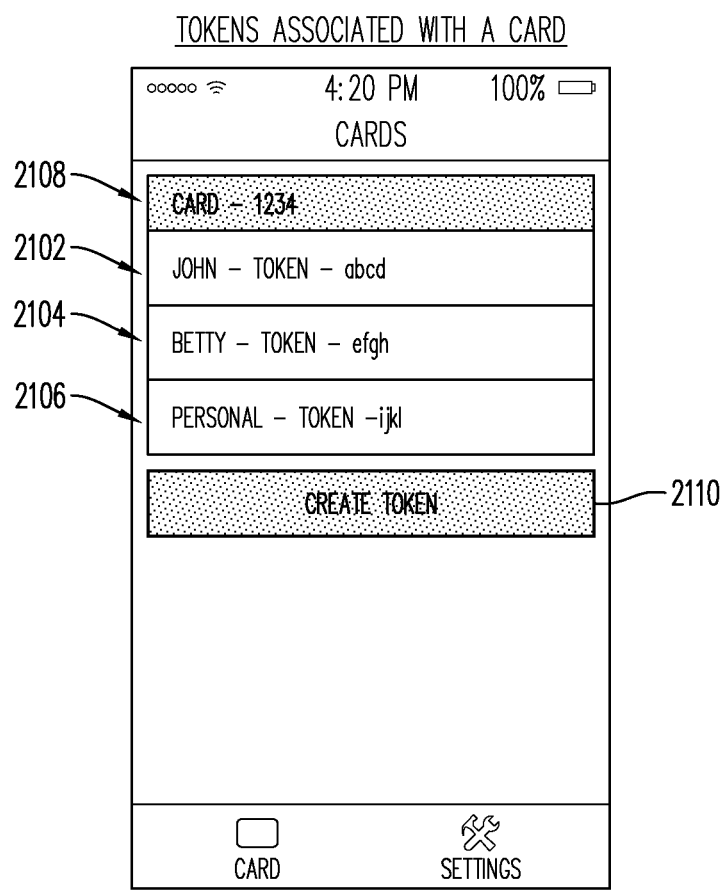
FIGS. 21-24 are simplified example mobile screen displays that may be provided to a parent payment account holder in accordance with aspects of the present disclosure.

Referring initially to FIG. 21, the screen display shown therein may provide the account holder of an overview/listing of the payment tokens that have been provisioned in connection with the account holder's payment account. Thus, in the screen display, each of lines 2102, 2104, 2106 may identify a respective payment token associated with the PAN indicated at 2108. In addition, the screen display of FIG. 21 may include a button 2110 which may be actuated by the account holder to initiate a token provisioning request.

Figure 22:
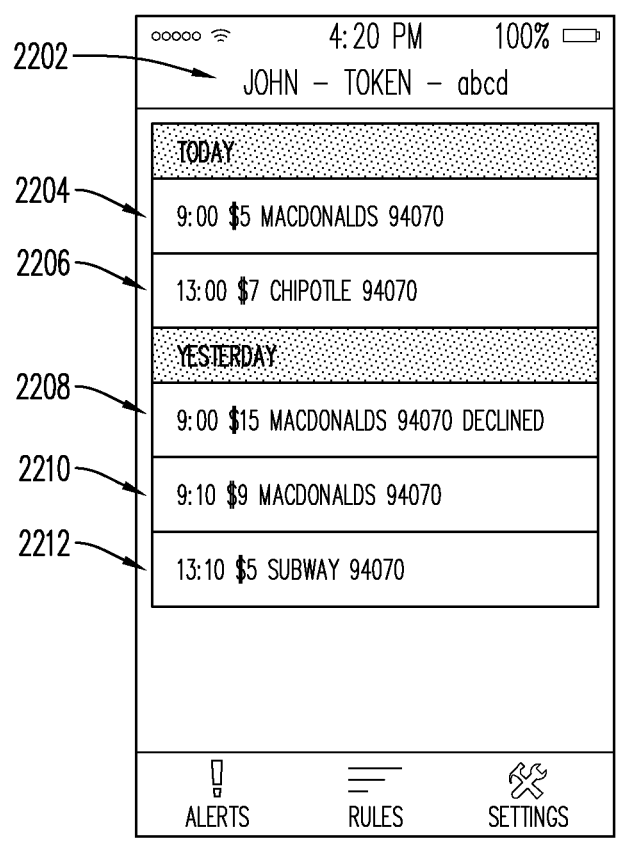

In the screen display of FIG. 22, a transaction history report is presented for a token identified at 2202. Each of the line items 2204, 2206, 2208, 2210 and 2212 corresponds to a respective transaction, and indicates the time of the transaction, transaction amount and merchant. It will be noted that the line items are grouped by day of transaction.

Figure 23:
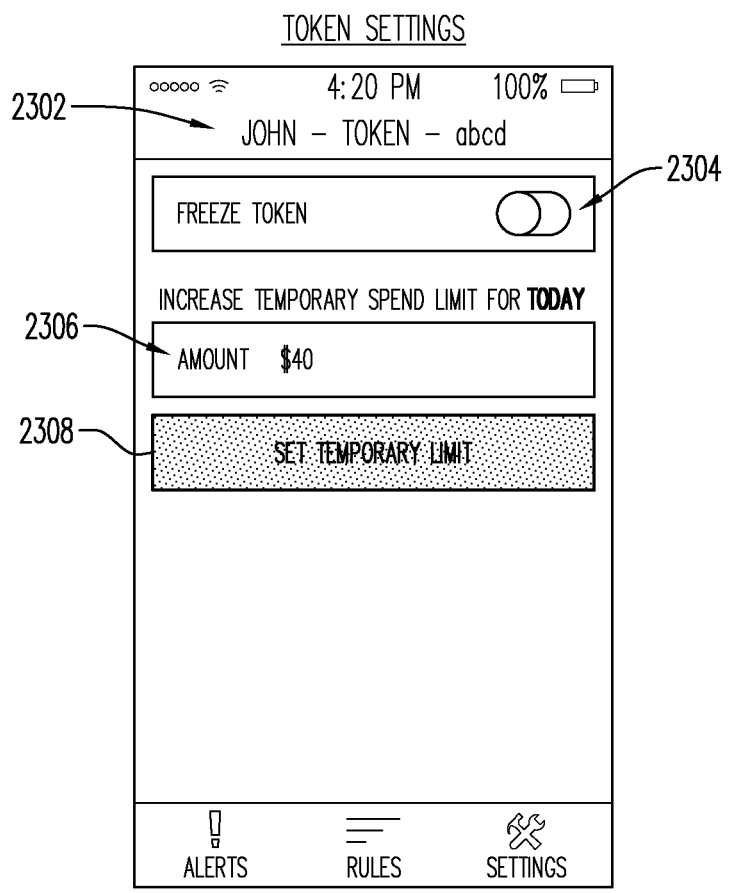

The screen display in FIG. 23 allows the account holder to take certain actions with respect to the payment token identified at 2302. One of the actions is "freezing" a token (temporarily disabling the token from being used in transactions), and may be accomplished by interacting with a slide button display element at 2304. Another action may be to temporarily increase the daily spend limit for the token for the current day. Data entry field 2306 allows entry of the increased amount of the daily spend limit, and actuation of the button 2308 causes the increased spend limit amount to be put into effect.

Figure 24:
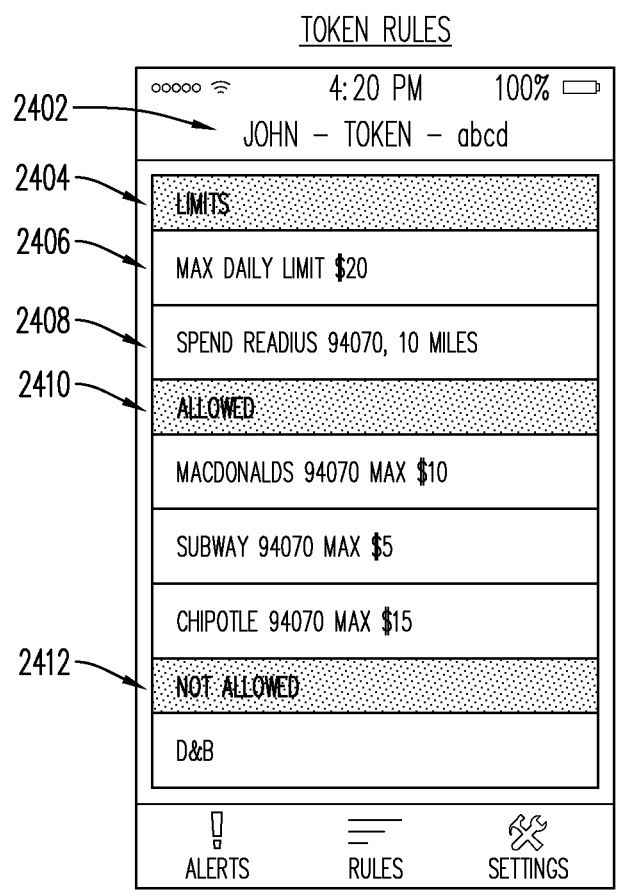

Referring now to FIG. 24, the screen display shown therein may provide the account holder with a list of the rules that the account holder has established for the payment token identified at 2402. Global limits are listed in section 2404, including a daily spend limit shown at 2406 and a geographic limit shown at 2408. Merchant-specific maximum transaction limits are presented in section 2410. Section 2412 lists a merchant for which transactions are blocked.

If a user loses a mobile device to which a payment token was provisioned, or if for some other reason it is necessary to block further transactions using the payment token (e.g., if an employee ceases employment with the account holder organization), the administrator or account holder may readily do so by interacting with the digitization support server computer 302. The digitization support server computer 302, in turn, may cause a suitable flag to be stored with the payment network 110a (FIG. 9), the token service provider 204 (FIG. 2), or at another suitable point in the payment system to disenable de-tokenization for the payment token in question or in some other way to prevent consummation of further payment transactions using the payment token.

In the arrangements shown in FIGS. 4 and 6, freezing/blocking of use of the payment token may alternatively be applied via the app in the child/family member mobile device. For example, the account holder may initiate communications from his/her mobile device to the child/family member's mobile device to render inoperative the payment app in the child/family member mobile device. Alternatively, the parent may have direct supervisory privileges over the payment app in the child/family member mobile device so that the parent may directly provide input to the child/family member mobile device to disable the payment app.

In terms of updating rules/controls of use of the payment tokens, this may be done by specific amending of rules by the administrator/parent. Alternatively, when an employee's position within the account holder organization changes, the administrator may provide a suitable update to the digitization support server computer 302. This may result in a new pre-defined set of rules being put into effect with respect to the employee's payment token (to reflect the employee's new job status or classification) and/or may cause the payment token to be linked to the PAN for a different department in place of the PAN to which the payment token was previously linked.

With provisioning of payment tokens to mobile devices of employees/children/family members, as described herein, the issuance of corporate payment accounts or family subaccounts may be greatly streamlined and made more convenient and efficient, and administrative burdens may be reduced, and there may be savings of time and effort. Controls on use of employee accounts or family subaccounts may be readily established and enforced, and also may be conveniently updated or modified.

The actions required of the administrator or parent/account holder may be accomplished easily via intuitive and user-friendly interfaces presented, e.g., via a mobile device/smartphone.

Moreover, the above-described manners of providing virtual corporate payment accounts and/or family subaccounts may reduce burdens and costs for account issuers.

In some embodiments, such as in the child/family member payment token scenario, the payment app in the child/family member mobile device may be operative to itself store and enforce rules regarding the use of the payment token provisioned to the child/family member mobile device. For example, the parent/account holder may enter input indicative of desired rules into the parent's mobile device, and then the corresponding rule data may be transferred from the parent's mobile device to the app in the child/family member mobile device by short-range radio communication or display and scan of a QR code. In other embodiments, the parent may be an additional/supervisory user of the child/family member mobile device and may directly input desired transaction rules into the child/family member mobile device. In some embodiments, the app in the child/family member mobile device may enforce geo-location restrictions on use of the payment token in addition to usage rules expressly defined by the parent/account holder for storage and self-enforcement in the child/family member mobile device.

Processes have been described above for the arrangement of, e.g., FIG. 3 that are suitable for use in a large organization. However, it should be understood that many of the processes described above as useful for a family/subaccount arrangement may also be usefully applicable to relatively small organizations. Accordingly, for example, peer-to-peer provisioning of a payment token (as in the process of FIG. 16) may in some situations be applied in the context of an organization.

In embodiments described above, use of the payment tokens has been primarily described in the context of in-store purchase transactions. However, the payment tokens may also be usable for e-commerce transactions, e.g., through operation of the payment app to which the payment token was provisioned.

Figure 25:
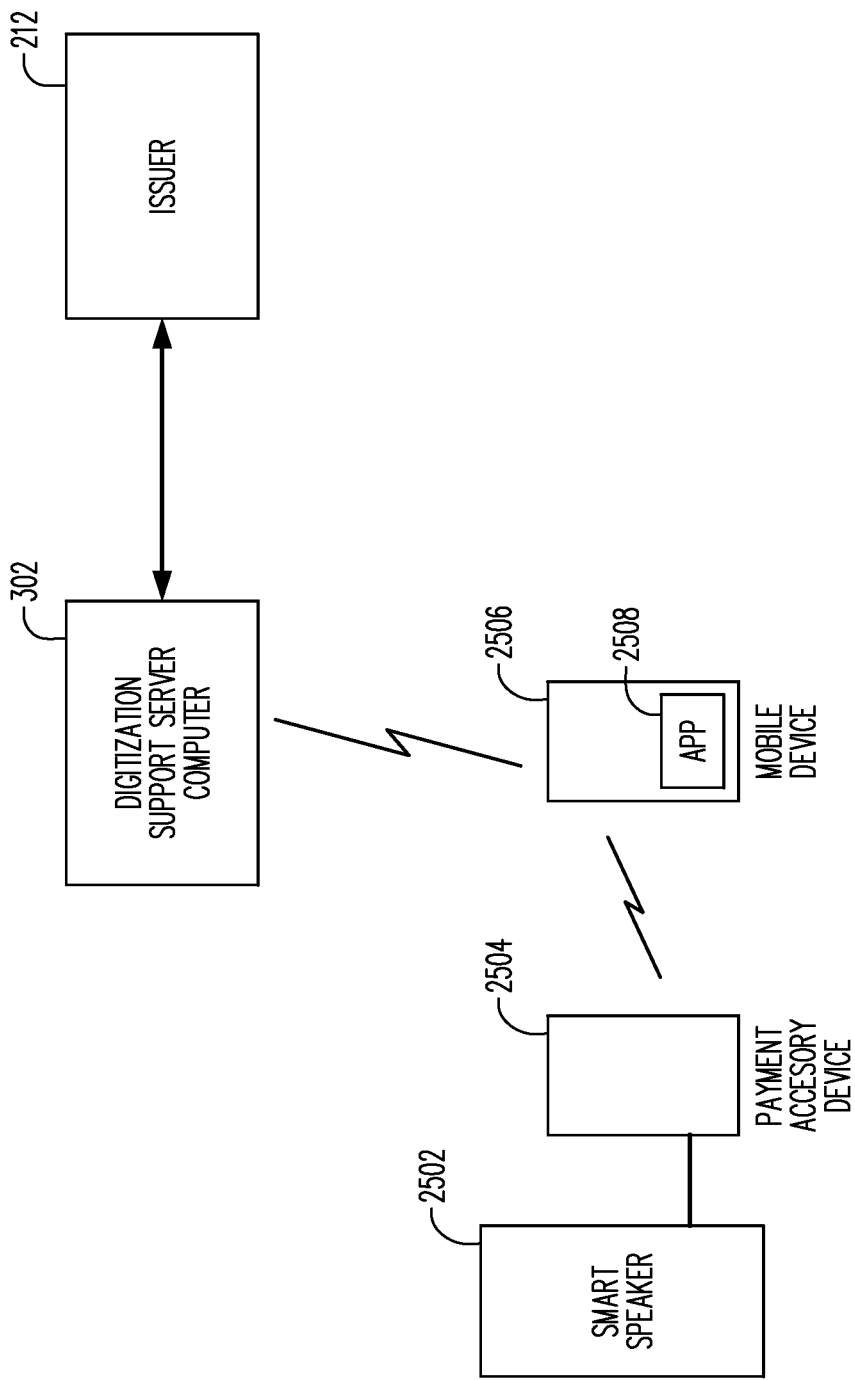
FIG. 25 is a block diagram that illustrates portions of a payment system according to some embodiments.

FIG. 25 is a block diagram that illustrates certain aspects of a payment system that may be provided according to teachings of the present disclosure and that may incorporate some or all of the elements of the payment systems illustrated in FIGS. 1 and 2. In particular, FIG. 25 is illustrative of an arrangement to aid an account holder to obtain provisioning of a payment token for use with a so-called "smart speaker".

Examples of commercially available smart speakers include the "Echo" product available from Amazon.com, Inc. and the "Google Home" product available from Google Inc. Products in this category are arranged to respond to voice commands and to give audio responses to users. Products in this category may offer a voice-implemented intelligent personal assistant software service. In the Amazon Echo device, the personal assistant service has been branded with the name "Alexa". In the Google Home device, the personal assistant service has been branded with the name "Google Assistant". Both of these software-based assistant services are in widespread use.

In FIG. 25, a smart speaker of this kind is indicated by reference numeral 2502. A payment accessory device 2504 is in communication (at least at times) with the smart speaker 2502 and serves as an accessory to the smart speaker 2502. For example, both the smart speaker 2502 and the payment accessory device 2504 may be connected to a local area data communication network (which is not shown; which may be wireless), and may thereby engage in data communication with each other. Details of the payment accessory device 2504 will be described below. A function of the payment accessory device 2504 may be to facilitate performance of tasks such as shopping and/or ordering products or services via a software-based assistant (not separately shown) that runs on the smart speaker 2502.

FIG. 25 further shows a mobile device 2506. A typical embodiment of the mobile device 2506 has previously been described herein with reference to FIG. 10.

Continuing to refer to FIG. 25, it will be noted that the digitization support server computer 302 is again shown, as is the account issuer 212. An app that has been downloaded to the mobile device 2506 is indicated at 2508. The app 2508 may function to support a request to provision a payment token to the payment accessory device 2504. It will be assumed that the account issuer 212 has issued a payment account to the user (not shown) of the mobile device 2506. The purpose of provisioning the payment token to the payment access device 2504 is to make the user's payment account accessible for use by an assistant function of the smart speaker 2502 in connection with shopping tasks or the like that the user commands the assistant function to undertake.

Continuing to refer to FIG. 25, the account holder may use the mobile device 2506 to interact "over the air" with the digitization support server computer 302 to request a payment token to be provisioned to the payment access device 2504 via the mobile device 2506. It may typically be the case that the digitization support server computer 302 obtains consent from the account issuer 212 before fulfilling the provisioning request from the account holder. Moreover, it may often be the case that the account issuer 212 will engage in an ID&V (identification and verification) process with respect to the account holder who is making the provisioning request. Alternatively, the digitization support server computer 302 may perform the ID&V or some other form of user authentication without involving the account issuer 212. For example, where the account holder's mobile device is payment-enabled, and with biometric user authentication typically performed for each transaction, in such a case it may be sufficient for the account holder to be authenticated by the customary biometric user authentication method.

Further details of example processes for provisioning a payment token to a payment accessory device will be provided below.

Figure 26:
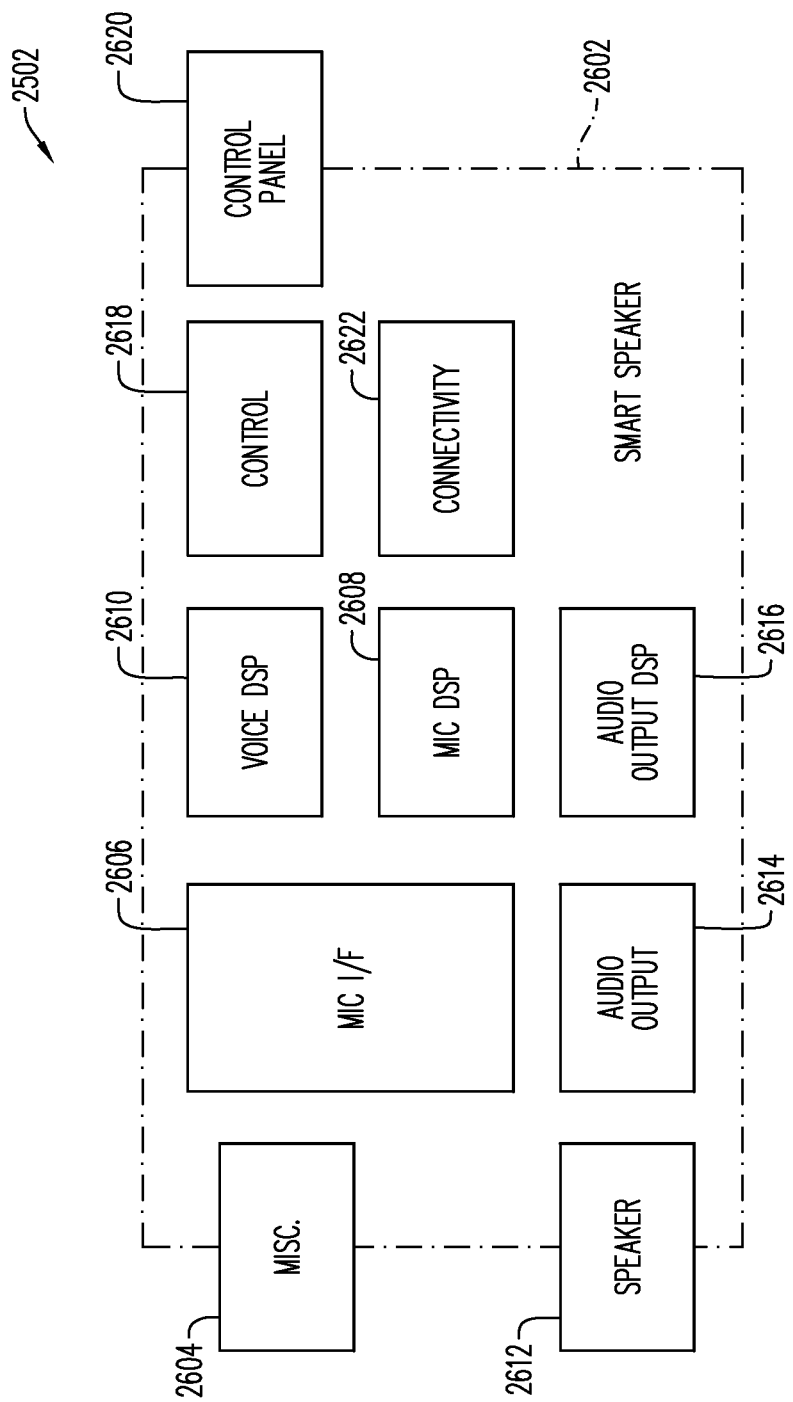
FIG. 26 is a block diagram that illustrates aspects of a smart speaker that is part of the system of FIG. 25.

FIG. 26 is a block diagram that illustrates aspects of the smart speaker 2502. In its hardware aspects, the smart speaker 2502 may resemble the hardware aspects of one or more of the above mentioned Amazon Echo and Google Home products.

Referring now to FIG. 26, the smart speaker 2502 may include a housing 2602 that contains and/or supports other components of the smart speaker 2502. The smart speaker 2502 may also include one or more microphones 2604. The microphones may be positioned and/or configured to detect and capture voice utterances of one or more users located in the same room (not shown) with the smart speaker 2502. The smart speaker 2502 may also include a microphone interface circuit 2606. The microphone interface circuit 2606 may perform functions such as filtering and analog-to-digital conversion with respect to input audio signals generated by the microphones 2604.

Still further, the smart speaker 2502 may include a microphone digital signal processor (DSP) 2608. The microphone DSP 2608 may perform functions such as beam forming, echo cancellation, noise suppression and de-reverb processing with respect to the incoming audio signal as obtained via the microphone interface circuit 2606.

In addition, the smart speaker 2502 may include a voice DSP 2610. The voice DSP 2610 may perform functions such as direction of arrival detection and voice activity detection with respect to the incoming audio signal.

The smart speaker 2502 may also include one or more speakers 2612. The smart speaker may provide audio responses to the user's utterances via the speaker 2612. The smart speaker 2502 may include an audio output circuit 2614 to drive the speaker 2612. There may also be an audio output DSP 2616 that is included in the smart speaker 2502. The audio output DSP 2616 may process the output audio signal before the output audio signal is supplied to the audio output circuit 2614.

Moreover, the smart speaker 2502 may include a control circuit 2618. The control circuit 2618 may include processing, memory and/or program storage resources (not separately shown). The control circuit 2618 may control overall operation of the smart speaker 2502. The control circuit 2618 may also implement voice and speech recognition processing, as well as the above-mentioned voice-implemented intelligent personal assistant function. Still further, the control circuit 2618 may synthesize speech for audio responses to be provided by the assistant function. Other software features of the smart speaker 2502 may also be implemented by the control circuit 2618.

Also, the smart speaker 2502 may include a control panel 2620. The control panel 2620 may include, for example, LEDs and/or user-actuatable buttons that may provide additional input/output functionality in addition to the speech/audio response interactions referred to above.

Further, the smart speaker 2502 may include a connectivity module 2622. The connectivity module 2622 may provide data communication connectivity for the smart speaker 2502 with one or more data networks and/or one or more other devices, including, for example, the payment accessory device 2504 (FIG. 25).

Figure 27:
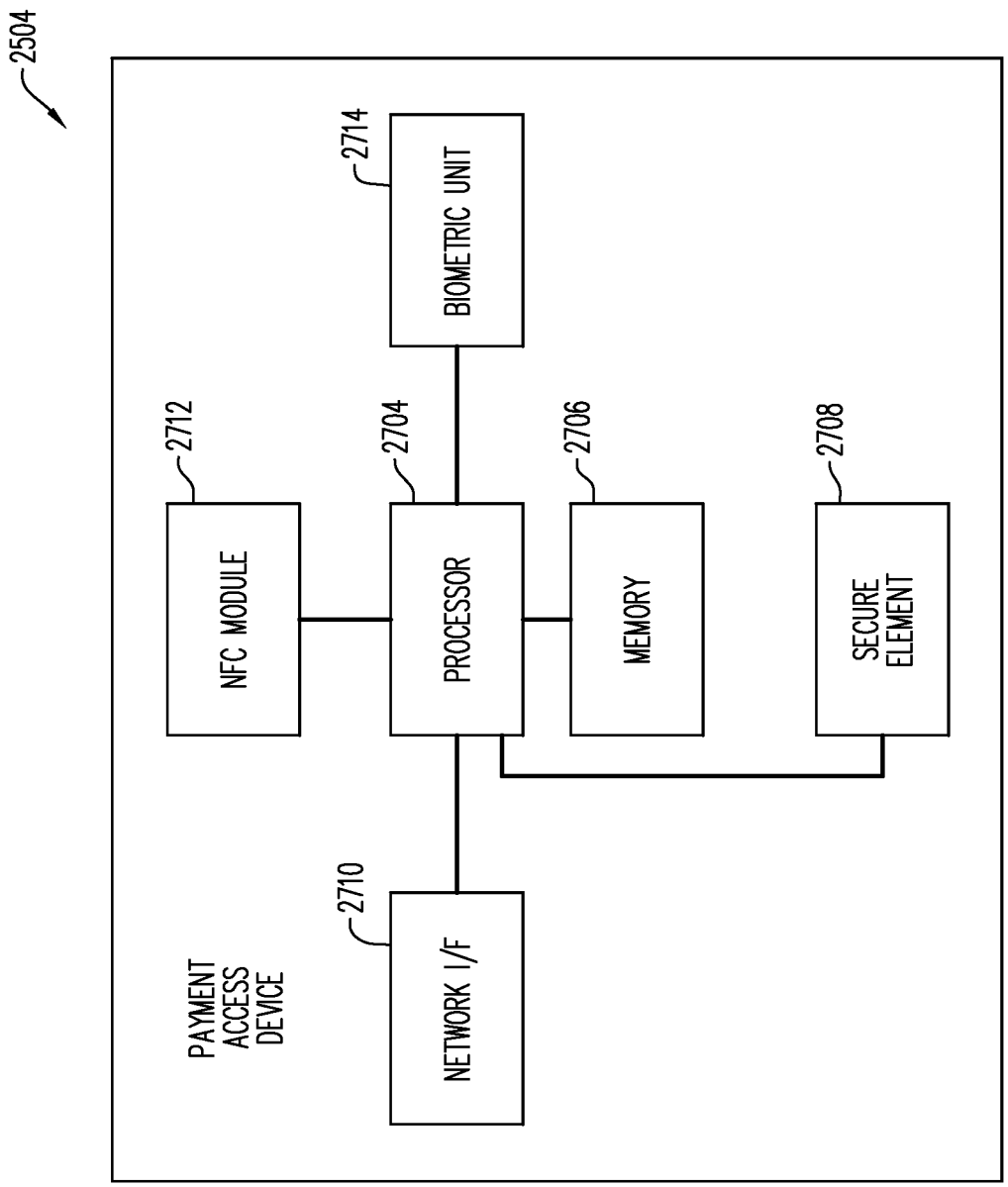
FIG. 27 is a block diagram that illustrates aspects of a payment accessory device that is part of the system of FIG. 25.

FIG. 27 is a block diagram that illustrates aspects of the payment accessory device 2504 shown in FIG. 25.

Referring now to FIG. 27, the payment accessory device 2504 may include a housing 2702 that contains and/or supports other components of the payment accessory device 2504.

The payment accessory device 2504 may further include a processor 2704. The processor 2704 may be a general purpose microprocessor or other device with at least some capabilities of a typical microprocessor or other processor typically provided to serve as the main control element for a small electronic device. The payment accessory device 2504 further includes a memory/program storage unit 2706. The memory 2706 may provide data storage functions and further may store program instructions for controlling the processor 2704. The memory 2706 may be in communication with the processor 2704. The processor 2704 may be operative with the program instructions to provide functionality as described herein.

Still further, the payment accessory device 2504 may include a secure element (SE) 2708, which may be included to provide enhanced security for sensitive payment-related data and/or programming instructions. The payment-related data may, for example, include a payment token and related data provisioned to the payment accessory device 2504. The SE 2708 may, for example, resemble like components sometimes incorporated in payment-enabled smartphones. In addition or alternatively, security for the payment-related data/programming resources may be enhanced by known alternatives to an SE, such as a TEE (trusted execution environment).

To the extent that the SE 2708 includes processing capabilities, it may functionally and/or physically overlap with and/or include the processor 2704. Moreover, the SE 2708 may functionally and/or physically overlap with or include the memory 2706.

The payment accessory device 2504 may also include a network interface 2710. The network interface 2710 may provide connectivity for the payment accessory device 2504 to a local area network (not shown) or the like. Data communication between the payment accessory device 2504 and the smart speaker 2502 may be performed via the network interface 2710, for example.

Moreover, the payment accessory device 2504 may include an NFC (near field communication) module 2712. The NFC module 2712 may provide the payment accessory device 2504 with capabilities for short range radio communication with other devices, such as the mobile device 2506 depicted in FIG. 25. Further, the payment accessory device 2504 may include a biometric unit 2714. In some embodiments, the biometric unit may be a fingerprint scanner (not separately shown). The fingerprint scanner may operate to scan the user's fingerprint or thumbprint to facilitate biometric-based user authentication by the payment accessory device 2504.

Figure 28:
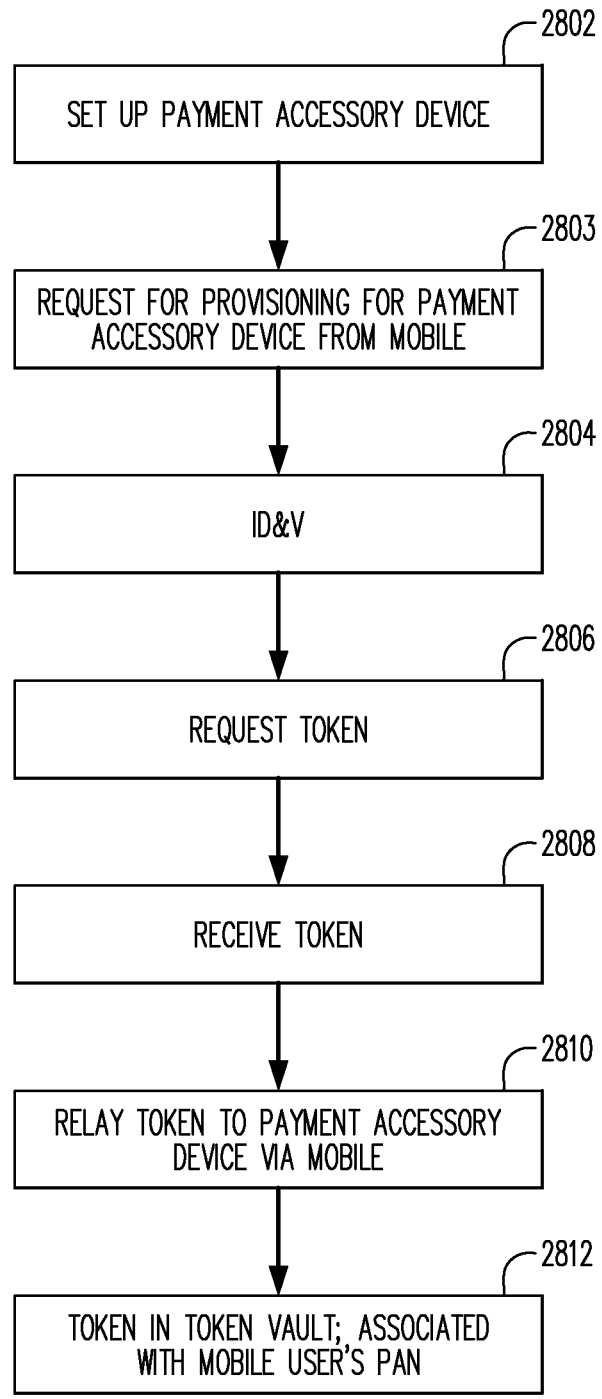
FIGS. 28 and 29 are flow charts that illustrate processes that may be performed in accordance with aspects of the present disclosure in the system of FIG. 25.

FIG. 28 is a block diagram that illustrates a process that may be performed in accordance with aspects of the present disclosure in connection with the arrangement illustrated in FIG. 25. In particular, FIG. 28 is illustrative of a process in which a payment token is provisioned to the payment accessory device 2504.

At 2802, the user (not shown) may engage in a set-up process with respect to the payment accessory device 2504. This may involve interaction between the payment accessory device 2504 and the mobile device 2506. More specifically, via the user interface of the mobile device 2506 and short range radio data communication between the mobile device 2506 and the payment accessory device 2504, the user may provide input to the payment accessory device 2504 and receive output therefrom. The set-up process may include, for example, storing reference biometric (e.g., fingerprint) data in the payment accessory device 2504 to enable subsequent biometric-based user authentication by the payment accessory device 2504.

At 2803 in FIG. 23, the digitization support server computer 302 receives a provisioning request. From discussion of other use cases herein, it will be appreciated that the digitization support server computer 302 may receive this request from the account holder via the user/account holder's mobile device 2506 (FIG. 25). A suitable app to support this functionality in the mobile device 2506 may have previously been downloaded to the mobile device 2506.

Block 2804 may follow block 2803 in the process of FIG. 28. At block 2804, the digitization support server computer 302 may make the account issuer 212 (FIG. 25) aware of the provisioning request, so that the account holder 212 may undertake a suitable ID&V process in regard to the account holder who has just submitted the provisioning request. Assuming that the ID&V process is completed successfully (or, alternatively, assuming that the digitization support server computer 302 has successfully completed a prescribed user authentication process with respect to the account holder), then block 2806 in FIG. 28 may follow block 2804. At block 2806, the digitization support server computer 302 may request a payment token from the token service provider 204 (FIG. 2) for provisioning to the payment accessory device 2504 (FIG. 25). In doing so, the digitization support server computer 302 may identify the relevant PAN, i.e., the PAN that identifies the (account holder's) payment account to which the payment token will be linked.

Block 2808 may follow block 2806 in the process of FIG. 28. At block 2808, the digitization support server computer 302 may receive the requested payment token from the token service provider 204.

Block 2810 may follow block 2808 in the process of FIG. 28. At block 2810, the digitization support server computer 302 may transmit the payment token to the mobile device 2506 to permit the mobile device 2506 to re-transmit the payment token to the payment accessory device 2504.

Figure 29:
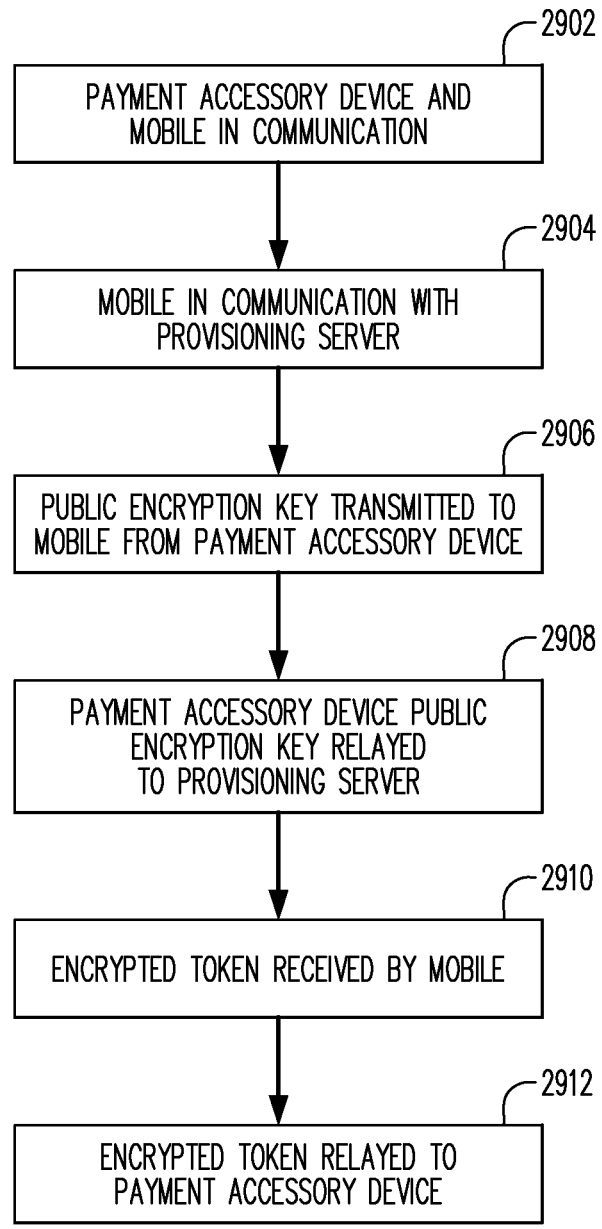

Reference will now be made to FIG. 29 to describe one example of a manner in which the processing of block 2810 may be performed.

In the process of FIG. 29, at block 2902, the user's mobile device 2506 may be placed in proximity to the payment accessory device 2504, and short range radio data communications (e.g., via NFC) may be established between the two devices.

Referring again to FIG. 29, block 2904 indicates that the mobile device 2506 is or remains in communication with the digitization support server computer 302, e.g., via the app 2508 in the mobile device 2506.

At block 2906 in FIG. 29, the payment accessory device 2504 may transmit its public encryption key to the mobile device 2506 and the app 2508 in the mobile device 2506; it will be understood that the mobile device 2506 and the app 2508 may receive the transmission of the public encryption key for the payment accessory device 2504.

At block 2908, the mobile device 2506/app 2508 may relay/re-transmit the public encryption key for the payment accessory device 2504 to the digitization support server computer 302.

In a step not explicitly shown in FIG. 29, the digitization support server computer 302 encrypts—with the public encryption key for the payment accessory device 2504—the payment token to be provisioned to the payment accessory device 2504, and as a result the payment token is placed in an encrypted form. In that form (perhaps with one or more additional layers of encryption) the digitization support server computer 302 may transmit the payment token to the mobile device 2506/app 2508. As indicated at block 2910 in FIG. 29, the mobile device 2506/app 2508 may receive the encrypted payment token from the digitization support server computer 302. It is to be noted that the mobile device 2506/app 2508 may lack the secret encryption key required to reverse the encryption implemented with the public encryption key for the payment accessory device 2504; consequently, the actual "in the clear" version of the payment token may not be accessible to the mobile device 2506/app 2508.

At block 2912 in FIG. 29, the mobile device 2506/app 2508 may relay (re-transmit) the encrypted payment token to the payment accessory device 2504. In a step not explicitly shown in FIG. 29, the payment accessory device 2504 may decrypt the encrypted payment token and store the decrypted payment token in the SE 2708, thereby completing the provisioning of the payment token to the payment accessory device 2504 via the mobile device 2506. Consequently, the payment accessory device 2504 is now equipped to facilitate use by the smart speaker 2502 of the payment token for purchase transactions.

Referring once more to FIG. 28, block 2812 may follow block 2810 in the process of FIG. 28. At block 2812, the digitization support server computer 302 may arrange that the payment token provisioned at 2810 to the payment accessory device 2504 is stored in the token vault 210 (FIG. 2) in association with the relevant PAN (i.e., in association with the PAN that identifies the payment account of the account holder who is the user of the mobile device 2506). Consequently, in payment transactions utilizing the payment token via the smart speaker 2502 (as enabled by the payment accessory device 2504), the de-tokenization stage of the transaction will result in translation of the payment token to the relevant PAN.

In the above description of the processes of FIGS. 28 and 29, communication between the payment accessory device 2504 and the smart speaker 2502 was described as being via short range radio, such as NFC. However, other modes/communications between the two devices are also contemplated. One such channel could be via USB, with a suitable cable providing a wired connection between the two devices.

Once the payment token has been provisioned to the payment accessory device 2504, the smart speaker 2502 may engage in purchase/ordering transactions while presenting the payment token for payment card account system transactions to settle/pre-pay for such purchase transactions.

For example, the user may issue a voice command to the smart speaker 2502 similar to, "Computer, order a large pepperoni pizza from Mary Ann's Pizzeria." The smart speaker 2502 may then access the e-commerce/online ordering system for the pizzeria, place an order for the type of pie requested, specify the user's home address for delivery, and automatically fill in a payment card account transaction data entry form. The latter step may include temporarily obtaining the payment token from the payment accessory device 2504 (after user authentication via the biometric unit 2714, FIG. 27) and using the payment token to fill in the payment card account number field in the pizzeria's payment card account transaction data entry form. The payment card account transaction may then proceed in accordance with a typical transaction flow for such transactions, including detokenization of the payment token.

In some embodiments, the payment system may define "intelligent personal assistants" as a domain for token use, the transactions initiated by such assistants may indicate that they are initiated by such assistants, and tokens provisioned for use by such assistants may be rejected if submitted by any other mechanism (e.g., card on file, swipe, payment-enabled mobile device, etc.) than via an intelligent personal assistant.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather, the method steps may be performed in any order that is practicable, including simultaneous performance of at least some steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment system" refers to a system for handling purchase transactions and related transactions. An example of such a system is the one operated by Mastercard International Incorporated, the assignee of the present disclosure. In some embodiments, the term "payment system" may be limited to systems in which member financial institutions issue payment accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method of operating a payment accessory device, the payment accessory device operatively coupled to a smart speaker, the smart speaker for providing a voice- implemented intelligent personal assistant software service, the method comprising:
    encrypting a payment token using a public key of the payment accessory device, wherein the public key has a corresponding secret encryption key adapted to decrypt the encryptedpayment token;
    communicating with a remote server computer via a mobile device to receive in the mobile device the encrypted payment token associated with a PAN (primary account number) that identifies a payment account owned by a user of the mobile device, wherein the mobile device lacks the secret encryption key;
    provisioning the encrypted payment token from the mobile device to the payment accessory device while positioning the mobile device for radio data communication with the payment accessory device, wherein provisioning includes the payment accessory device decrypting the encrypted payment token with the secret encryption key and provisioning includes storing the encrypted payment token at the payment accessory device;
    presenting, by the payment accessory device, the payment token to the smart speaker for an individual transaction in settling, by the smart speaker, purchases made in the individual transaction by a user via voice commands to the smart speaker, wherein the stored payment token is temporarily obtained in a per-transaction-basis by the smart speaker for the individual transaction and the temporary obtainment is in response to the voice command to the smart speaker to initiate the individual transaction; and
    transmitting, by the smart speaker, payment token data of the payment token to a merchant of the individual transaction.

2. The method of claim 1, wherein the provisioning is via radio data communications between the mobile device and the payment accessory device.

3. The method of claim 2, further comprising:
    receiving, by the mobile device, the public encryption key from the payment accessory device, said public encryption key digitally signed by the payment accessory device to prevent tampering with said public encryption key; and
    relaying the public encryption key in a message to the remote server computer via the mobile device, the message digitally signed by the mobile device to prevent tampering with the message.

4. The method of claim 1, wherein the mobile device is a smartphone.

5. The method of claim 1, wherein the mobile device is a tablet computer.

6. The method of claim 1, wherein the payment accessory device includes a secure element for storing the payment token.

7. The method of claim 6, wherein the payment accessory device includes an NFC (near field communication) component for engaging in radio communication with the mobile device.

8. The method of claim 1, wherein the payment accessory device includes an NFC (near field communication) component for engaging in radio communication with the mobile device.

9. The method of claim 1, wherein the payment accessory device includes a fingerprint scanner.

10. The method of claim 1, wherein the presentation of the payment token is based on at least one rule of a set of rules adapted to constrain use of the payment token.

11. The method of claim 1, wherein presentation of the payment token is in response to receipt of a voice command at the smart speaker.

12. The method of claim 1, wherein the stored payment token is used in at least one process following temporary obtainment of the payment token by the smart speaker.

13. The method of claim 1, further comprising:
    authenticating the user prior to temporarily obtaining the stored payment token.

14. The method of claim 1, further comprising:
    obtaining, by the smart speaker, additional user information;

combining, at the smart speaker, the additional user information with the payment token data; and transmitting the combined information to the merchant from the smart speaker.

15. A system, comprising:

a processor; and a memory in communication with the processor, the memory storing program instructions which when executed by the processor cause the processor to:

encrypt, by a remote server computer, a payment token using a public key of a payment accessory device, wherein the public key has a corresponding secret encryption key adapted to decrypt the encrypted payment token;

communicate, by a mobile device, with the remote server computer to receive in the mobile device the encrypted payment token associated with a PAN (primary account number) that identifies a payment account owned by a user of the mobile device, wherein the mobile device lacks the secret encryption key;

provision the encrypted payment token from the mobile device to the payment accessory device while positioning the mobile device for radio data communication with the payment accessory device, the provisioning including the payment accessory device decrypting the encrypted payment token with the secret encryption key and provisioning includes storing the encrypted payment token at the payment accessory device;

temporarily present, by the payment accessory device to a smart speaker, the payment token in a per-transaction-basis for an individual transaction in settling purchases made in the individual transaction by a user via voice commands to the smart speaker and the temporary presentation is in response to the voice command to the smart speaker to initiate the individual transaction; and transmit, by the smart speaker, payment token data of the payment token to a merchant of the individual transaction.

16. The mobile device of claim 15, wherein the provisioning is via radio data communications to the payment accessory device.

17. The mobile device of claim 16, wherein the processor is further operative with the program instructions to perform further functions as follows:

receiving the public encryption key from the payment accessory device, said public encryption key digitally signed by the payment accessory device to prevent tampering with said public encryption key; and relaying the public encryption key in a message to a remote server computer via the mobile device, the message digitally signed by the mobile device to prevent tampering with the message.

18. The mobile device of claim 17, wherein the processor is further operative with the program instructions to receive from the remote server computer, prior to the provisioning step and after the receiving step, the payment token in said encrypted form.

* * * * *